(12) United States Patent
Nogi

(10) Patent No.: US 10,077,744 B2
(45) Date of Patent: Sep. 18, 2018

(54) EXHAUST GAS CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventor: Yoshito Nogi, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 149 days.

(21) Appl. No.: 15/105,814

(22) PCT Filed: Dec. 20, 2013

(86) PCT No.: PCT/JP2013/084352
§ 371 (c)(1),
(2) Date: Jun. 17, 2016

(87) PCT Pub. No.: WO2015/092932
PCT Pub. Date: Jun. 25, 2015

(65) Prior Publication Data
US 2017/0022939 A1    Jan. 26, 2017

(51) Int. Cl.
*F02B 33/44*    (2006.01)
*F02M 25/06*    (2016.01)
(Continued)

(52) U.S. Cl.
CPC ........... *F02M 26/04* (2016.02); *F01N 3/0842* (2013.01); *F01N 3/0871* (2013.01); *F02B 37/12* (2013.01);
(Continued)

(58) Field of Classification Search
CPC ........ F02M 26/04; F02M 26/05; F02M 26/06; F02M 26/15; F02M 26/50; F02M 26/52;
(Continued)

(56) References Cited

U.S. PATENT DOCUMENTS 8,341,947 B2 *   1/2013   Hepburn ............. F02D 41/1475
                                                      60/274
8,387,370 B2 *   3/2013   Van Nieuwstadt ..........
                                                F02D 41/0055
                                                      60/280
(Continued)

FOREIGN PATENT DOCUMENTS

DE   102009014361 A1 *   9/2010   .......... F01N 13/009
EP   0 752 521 A1         1/1997
(Continued)

*Primary Examiner* — Thai Ba Trieu
(74) *Attorney, Agent, or Firm* — Finnegan, Henderson, Farabow, Garrett & Dunner, LLP

(57) ABSTRACT

A rich control for temporarily declining an air-fuel ratio of exhaust gas discharged from an engine combustion chamber is performed by an additional fuel being injected into a cylinder in an expansion stroke or an exhaust stroke in a state where a throttle opening degree is switched from a base throttle opening degree to a throttle opening degree for the rich control and an EGR rate is switched from a base EGR rate to an EGR rate for the rich control. The rich control is initiated by switching a low pressure side EGR control valve opening degree (VEGRL) to a low pressure side EGR control valve opening degree for the rich control (VEGRLR), then switching a high pressure side EGR control valve opening degree (VEGRH) to a high pressure side EGR control valve opening degree for the rich control (VEGRHR), then controlling the throttle opening degree (VTH), and then initiating the injection of the additional fuel (Qa).

5 Claims, 23 Drawing Sheets

(51) Int. Cl.

| | | |
|---|---|---|
| *F01N 5/04* | (2006.01) | |
| *F02M 26/04* | (2016.01) | |
| *F02D 21/08* | (2006.01) | |
| *F02D 41/00* | (2006.01) | |
| *F02D 41/02* | (2006.01) | |
| *F02D 41/14* | (2006.01) | |
| *F01N 3/08* | (2006.01) | |
| *F02M 26/05* | (2016.01) | |
| *F02M 26/06* | (2016.01) | |
| *F02M 26/15* | (2016.01) | |
| *F02M 26/50* | (2016.01) | |
| *F02M 26/52* | (2016.01) | |
| *F02B 37/12* | (2006.01) | |
| *F02B 47/08* | (2006.01) | |
| *F01N 13/00* | (2010.01) | |
| *F02M 26/24* | (2016.01) | |

(52) U.S. Cl.
CPC .............. *F02B 47/08* (2013.01); *F02D 21/08* (2013.01); *F02D 41/0007* (2013.01); *F02D 41/0055* (2013.01); *F02D 41/0065* (2013.01); *F02D 41/0275* (2013.01); *F02D 41/1475* (2013.01); *F02M 26/05* (2016.02); *F02M 26/06* (2016.02); *F02M 26/15* (2016.02); *F02M 26/50* (2016.02); *F02M 26/52* (2016.02); *F01N 13/009* (2014.06); *F01N 2610/03* (2013.01); *F01N 2900/0422* (2013.01); *F01N 2900/1602* (2013.01); *F01N 2900/1614* (2013.01); *F02D 2041/0017* (2013.01); *F02D 2200/0406* (2013.01); *F02D 2200/0812* (2013.01); *F02M 26/24* (2016.02); *Y02T 10/144* (2013.01); *Y02T 10/47* (2013.01)

(58) Field of Classification Search
CPC ..... F02M 26/24; F01N 3/0842; F01N 3/0871; F01N 13/009; F01N 2610/03; F01N 2900/0422; F01N 2900/1602; F01N 2900/1614; F02B 37/12; F02B 47/08; F02D 21/08; F02D 2041/0017; F02D 2200/0406; F02D 2200/0812; F02D 41/0007; F02D 41/0055; F02D 41/0065; F02D 41/0275; F02D 41/1475; Y02T 10/144; Y02T 10/47

USPC ........ 60/605.2, 278, 280, 285, 288; 701/108
See application file for complete search history.

(56) References Cited

U.S. PATENT DOCUMENTS

| | | | |
|---|---|---|---|
| 8,833,059 B2 * | 9/2014 | Keppeler | ............... F01N 13/009 60/280 |
| 8,978,603 B2 * | 3/2015 | Williams | ............... F02M 26/37 123/52.1 |
| 9,689,354 B1 * | 6/2017 | Beresford-Knox | .......................... F02D 41/0077 |
| 2005/0022517 A1 | 2/2005 | Miura | |
| 2007/0056266 A1 | 3/2007 | Kurtz | |
| 2011/0289918 A1 * | 12/2011 | Wada | .................. F02D 41/0065 60/605.2 |
| 2012/0014838 A1 * | 1/2012 | Yasui | .................. F02D 41/0062 422/105 |
| 2013/0269327 A1 * | 10/2013 | Keppeler | ............... F01N 13/009 60/301 |
| 2014/0041367 A1 * | 2/2014 | Balthes | ................. F01N 13/009 60/274 |
| 2014/0325963 A1 * | 11/2014 | Nagaoka | ............... F02D 41/027 60/274 |
| 2014/0352298 A1 * | 12/2014 | Nogawa | .............. F02D 41/1475 60/605.2 |
| 2015/0057911 A1 * | 2/2015 | Wooldridge | ........ F02D 41/0007 701/108 |
| 2015/0101564 A1 * | 4/2015 | Surnilla | ................ F02D 41/005 60/278 |
| 2015/0247441 A1 * | 9/2015 | Takita | ................... F01N 3/0835 73/114.75 |
| 2015/0330276 A1 * | 11/2015 | Nozaki | ................. F01N 3/0842 60/274 |

FOREIGN PATENT DOCUMENTS

| | | | |
|---|---|---|---|
| EP | 1 083 322 A2 | 3/2001 | |
| EP | 1 965 050 A1 | 9/2008 | |
| JP | 2003-322015 | 11/2003 | |
| JP | 2005-48724 | 2/2005 | |
| WO | WO 2012143025 A1 * | 10/2012 | ........... F01N 13/009 |

* cited by examiner

FIG. 17

L | $REGRLB_{11}$ $REGRLB_{21}$ ···· $REGRLB_{m1}$
  | $REGRLB_{12}$
  | ⋮                                  ⋮
  | $REGRLB_{1n}$ ············ $REGRLB_{mn}$
                                             N

FIG. 18

$REGRHB_{11}$ $REGRHB_{21}$ ···· $REGRHB_{m1}$
$REGRHB_{12}$
⋮                                  ⋮
$REGRHB_{1n}$ ············ $REGRHB_{mn}$

FIG. 19

L | $VTHB_{11}$ $VTHB_{21}$ ····· $VTHB_{m1}$
  | $VTHB_{12}$
  | ⋮                                ⋮
  | $VTHB_{1n}$ ············ $VTHB_{mn}$
                                         N

FIG. 20

$L$ | $QmB_{11}$ $QmB_{21}$ ·········· $QmB_{m1}$
$QmB_{12}$
⋮
$QmB_{1n}$ ················ $QmB_{mn}$
_____
$N$

FIG. 21

$L$ | $\theta mB_{11}$ $\theta mB_{21}$ ·········· $\theta mB_{m1}$
$\theta mB_{12}$
⋮
$\theta mB_{1n}$ ················ $\theta mB_{mn}$
_____
$N$

FIG. 22

$$\begin{array}{l} L \begin{array}{|llll} REGRLR_{11} & REGRLR_{21} & \cdots & REGRLR_{m1} \\ REGRLR_{12} & & & \vdots \\ \vdots & & & \vdots \\ REGRLR_{1n} & \cdots\cdots\cdots & REGRLR_{mn} \end{array} \\ \phantom{xxxxxxxxxxxxxxxxxxxxxxxxxxxxxxxxxx} N \end{array}$$

FIG. 23

$$\begin{array}{l} L \begin{array}{|llll} REGRHR_{11} & REGRHR_{21} & \cdots & REGRHR_{m1} \\ REGRHR_{12} & & & \vdots \\ \vdots & & & \vdots \\ REGRHR_{1n} & \cdots\cdots\cdots & REGRHR_{mn} \end{array} \\ \phantom{xxxxxxxxxxxxxxxxxxxxxxxxxxxxxxxxxx} N \end{array}$$

FIG. 24

$$\begin{array}{l} L \begin{array}{|llll} VTHR_{11} & VTHR_{21} & \cdots & VTHR_{m1} \\ VTHB_{12} & & & \vdots \\ \vdots & & & \vdots \\ VTHR_{1n} & \cdots\cdots\cdots & VTHR_{mn} \end{array} \\ \phantom{xxxxxxxxxxxxxxxxxxxxxxxxxxxxxxxxxx} N \end{array}$$

EXHAUST GAS CONTROL APPARATUS FOR INTERNAL COMBUSTION ENGINE

CROSS-REFERENCE TO RELATED APPLICATIONS

This application is a national phase application of International Application No. PCT/JP2013/084352, filed Dec. 20, 2013, the content of which is incorporated herein by reference.

TECHNICAL FIELD

The invention relates to an exhaust gas control apparatus for an internal combustion engine.

BACKGROUND ART

An exhaust gas control apparatus for an internal combustion engine is known (refer to PTL 1) in which an engine intake passage and an engine exhaust passage are connected to each other by an exhaust gas recirculation passage, an exhaust gas recirculation control valve controlling an exhaust gas recirculation rate is disposed in the exhaust gas recirculation passage, a rich control for temporarily declining an air-fuel ratio of exhaust gas discharged from an engine combustion chamber is performed in a state where a throttle opening degree is decreased and the exhaust gas recirculation rate is reduced, and an opening degree of the exhaust gas recirculation control valve is decreased along with the decrease in the throttle opening degree, such that the exhaust gas recirculation rate is reduced, when the rich control is initiated.

In addition, another exhaust gas control apparatus for an internal combustion engine is also known in which the air-fuel ratio of the exhaust gas discharged from the engine combustion chamber is temporarily declined by an additional fuel being injected into a cylinder in an expansion stroke or an exhaust stroke in a state where the throttle opening degree is decreased and the exhaust gas recirculation rate is reduced during the rich control. In this exhaust gas control apparatus, the rich control is performed in the state where the throttle opening degree is decreased and the exhaust gas recirculation rate is reduced, and thus an additional fuel amount that is required for the air-fuel ratio of the exhaust gas to be enriched can be reduced.

Furthermore, an internal combustion engine is also known that is provided with an exhaust turbocharger which drives a compressor disposed in an engine intake passage on the upstream side of a throttle valve with an exhaust turbine disposed in an engine exhaust passage, a high pressure exhaust gas recirculation passage which connects the engine exhaust passage on the upstream side of the exhaust turbine and the engine intake passage on the downstream side of the throttle valve to each other, a low pressure exhaust gas recirculation passage which connects the engine exhaust passage on the downstream side of the exhaust turbine and the engine intake passage on the upstream side of the compressor to each other, a high pressure exhaust gas recirculation control valve which is disposed in the high pressure exhaust gas recirculation passage so as to control a high pressure exhaust gas recirculation rate, and a low pressure exhaust gas recirculation control valve which is disposed in the low pressure exhaust gas recirculation passage so as to control a low pressure exhaust gas recirculation rate.

CITATION LIST

Patent Literature

PTL 1: Japanese Patent Application Publication No. 2005-048724

SUMMARY OF THE INVENTION

In the internal combustion engine that is provided with the high pressure exhaust gas recirculation passage and the low pressure side exhaust gas recirculation passage, a simultaneous decrease in the throttle opening degree, a high pressure exhaust gas recirculation control valve opening degree, and a low pressure exhaust gas recirculation control valve opening degree during the initiation of the rich control results in a significant decrease in an in-cylinder gas amount and a significant reduction in a compression end temperature. As a result, the risk of the occurrence of a misfire increases.

An object of the invention is to provide an exhaust gas control apparatus for an internal combustion engine that is capable of suppressing the risk of the occurrence of a misfire when a rich control is initiated.

According to the invention, there is provided an exhaust gas control apparatus for an internal combustion engine having an exhaust turbocharger driving a compressor disposed in an engine intake passage on an upstream side of a throttle valve with an exhaust turbine disposed in an engine exhaust passage, a high pressure exhaust gas recirculation passage connecting the engine exhaust passage on an upstream side of the exhaust turbine and the engine intake passage on a downstream side of the throttle valve to each other, a low pressure exhaust gas recirculation passage connecting the engine exhaust passage on a downstream side of the exhaust turbine and the engine intake passage on an upstream side of the compressor to each other, a high pressure exhaust gas recirculation control valve disposed in the high pressure exhaust gas recirculation passage so as to control a high pressure exhaust gas recirculation rate, and a low pressure exhaust gas recirculation control valve disposed in the low pressure exhaust gas recirculation passage so as to control a low pressure exhaust gas recirculation rate, in which a rich control for temporarily declining an air-fuel ratio of exhaust gas discharged from an engine combustion chamber is performed by an additional fuel being injected into a cylinder in an expansion stroke or an exhaust stroke in a state where a throttle opening degree, which is an opening degree of the throttle valve disposed in the intake passage and controlling a suctioned air amount, is switched from a base throttle opening degree to a throttle opening degree for the rich control lower than the base throttle opening degree, the high pressure exhaust gas recirculation rate is switched from a base high pressure exhaust gas recirculation rate to a high pressure exhaust gas recirculation rate for the rich control different from the base high pressure exhaust gas recirculation rate, and the low pressure exhaust gas recirculation rate is switched from a base low pressure exhaust gas recirculation rate to a low pressure exhaust gas recirculation rate for the rich control different from the base low pressure exhaust gas recirculation rate, a low pressure exhaust gas recirculation control valve opening degree being controlled first such that the low pressure exhaust gas recirculation rate is switched to the low pressure exhaust gas recirculation rate for the rich control, and then a high pressure exhaust gas recirculation control valve opening degree being controlled such that the high pressure exhaust gas recirculation rate is switched to the high pressure exhaust gas recirculation rate for the rich control, and then the throttle opening degree being switched to the throttle opening degree for the rich control, and then the injection of the additional fuel being initiated when the rich control is initiated.

The risk of the occurrence of a misfire can be suppressed when the rich control is initiated.

BRIEF DESCRIPTION OF THE DRAWINGS

FIG. 17 is a drawing illustrating a map of a base low pressure EGR rate REGRLB.

FIG. 18 is a drawing illustrating a map of a base high pressure EGR rate REGRHB.

FIG. 19 is a drawing illustrating a map of a base throttle opening degree VTHB.

FIG. 20 is a drawing illustrating a map of a base main fuel amount QmB.

FIG. 21 is a drawing illustrating a map of a base main fuel injection timing θmB.

FIG. 22 is a drawing illustrating a map of a low pressure EGR rate REGRLR for the rich control.

FIG. 23 is a drawing illustrating a map of a high pressure EGR rate REGRHR for the rich control.

FIG. 24 is a drawing illustrating a map of a throttle opening degree VTHR for the rich control.

MODES FOR CARRYING OUT THE INVENTION

Figure 1:
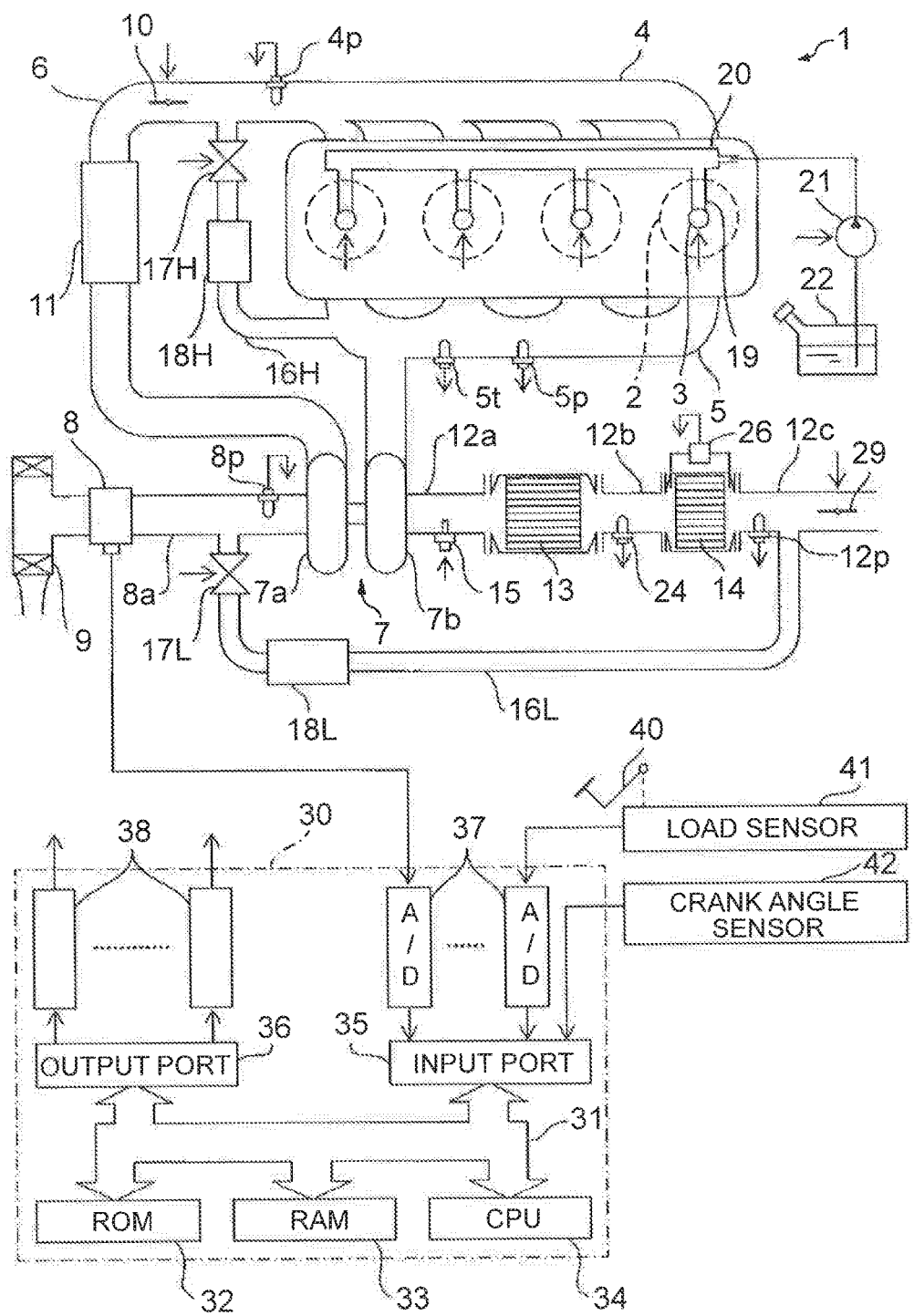
FIG. 1 is an overall view of a compression ignition-type internal combustion engine.

An overall view of a compression ignition-type internal combustion engine is illustrated in FIG. 1.

Referring to FIG. 1, 1 represents an engine main body, 2 represents respective combustion chambers of cylinders, 3 represents electronically controlled fuel injection valves for injecting a fuel into the respective combustion chambers 2, 4 represents an intake manifold, and 5 represents an exhaust manifold. The intake manifold 4 is connected to an outlet of a compressor 7a of an exhaust turbocharger 7 via an intake duct 6, and an inlet of the compressor 7a is connected to an air cleaner 9 via an intake air introduction pipe 8a where a suctioned air amount detector 8 is disposed. A throttle valve 10 that is driven by an actuator is disposed in the intake duct 6, and a cooling device 11 for cooling suctioned air flowing through the intake duct 6 is disposed around the intake duct 6. In the example that is illustrated in FIG. 1, engine cooling water is guided into the cooling device 11 and the suctioned air is cooled by the engine cooling water. In addition, a pressure sensor 4p for detecting a pressure in the intake manifold 4, that is, an intake pressure, is attached to the intake manifold 4 at a position on the downstream side of the throttle valve 10, and a pressure sensor 5p for detecting a pressure in the exhaust manifold 5, that is, an exhaust pressure, is attached to the exhaust manifold 5. Furthermore, a temperature sensor 5t for detecting the temperature of exhaust gas in the exhaust manifold 5 is attached to the exhaust manifold 5.

The exhaust manifold 5 is connected to an inlet of an exhaust turbine 7b of the exhaust turbocharger 7, and an outlet of the exhaust turbine 7b is connected to an inlet of an exhaust gas control catalyst 13 via an exhaust pipe 12a. In the example according to the invention, the exhaust gas control catalyst 13 is a NOx storage catalyst. An outlet of the exhaust gas control catalyst 13 is connected to a particulate filter 14 via an exhaust pipe 12b. In the exhaust pipe 12a, a hydrocarbon supply valve 15 for supplying hydrocarbons consisting of gas oil and other fuels used as a fuel of the compression ignition-type internal combustion engine is disposed on the upstream side of the exhaust gas control catalyst 13. In the example that is illustrated in FIG. 1, the gas oil is used as the hydrocarbon that is supplied from the hydrocarbon supply valve 15. An exhaust pipe 12c is connected to the particulate filter 14. The invention can also be applied to a spark ignition-type internal combustion engine in which combustion is performed at a lean air-fuel ratio. In this case, the hydrocarbon supply valve 15 supplies hydrocarbons consisting of gasoline and other fuels used as a fuel of the spark ignition-type internal combustion engine.

The exhaust manifold 5 on the upstream side of the exhaust turbine 7b and the intake manifold 4 on the downstream side of the throttle valve 10 are connected to each other via a high pressure exhaust gas recirculation (hereinafter, referred to as EGR) passage 16H, and an electrically controlled high pressure EGR control valve 17H is disposed in the high pressure EGR passage 16H. In addition, a cooling device 18H for cooling EGR gas flowing through the high pressure EGR passage 16H is disposed around the high pressure EGR passage 16H. In addition, an exhaust throttle valve 29 is disposed in the exhaust pipe 12c. The exhaust pipe 12c on the upstream side of the exhaust throttle valve 29 and the intake air introduction pipe 8a on the downstream side of the suctioned air amount detector 8 are connected to each other via a low pressure EGR passage 16L, and an electrically controlled low pressure EGR control valve 17L is disposed in the low pressure EGR passage 16L. In addition, a cooling device 18L for cooling the EGR gas flowing through the low pressure EGR passage 16L is disposed around the low pressure EGR passage 16L. In another example, the exhaust throttle valve is omitted. A pressure sensor 8p for detecting a pressure in the intake air introduction pipe 8a is attached to the intake air introduction pipe 8a on the downstream side of the suctioned air amount detector 8, and a pressure sensor 12p for detecting a pressure in the exhaust pipe 12c is attached to the exhaust pipe 12c on the upstream side of the exhaust throttle valve 29.

Each of the fuel injection valves 3 is connected to a common rail 20 via a fuel supply pipe 19, and this common rail 20 is connected to a fuel tank 22 via a fuel pump 21 that is electronically controlled and has a variable discharge amount. The fuel that is stored in the fuel tank 22 is supplied into the common rail 20 by the fuel pump 21, and the fuel supplied into the common rail 20 is supplied to the fuel injection valves 3 via the respective fuel supply pipes 19.

An electronic control unit 30 consists of a digital computer and is provided with a read-only memory (ROM) 32, a random access memory (RAM) 33, a CPU (microprocessor) 34, an input port 35, and an output port 36, which are connected to one another by a bidirectional bus 31. A temperature sensor 24 for detecting the temperature of the exhaust gas flowing out from the exhaust gas control catalyst 13 is attached to the exhaust pipe 12b on the downstream side of the exhaust gas control catalyst 13. The temperature of the exhaust gas flowing out from the exhaust gas control catalyst 13 represents the temperature of the exhaust gas control catalyst 13. In addition, a differential pressure sensor 26 for detecting a differential pressure across the particulate filter 14 is attached to the particulate filter 14. Output signals of the temperature sensor 24, the differential pressure sensor 26, the pressure sensors 4p, 5p, 8p, 12p, the temperature sensor 5t, and the suctioned air amount detector 8 are input to the input port 35 via respectively corresponding AD converters 37. In addition, a load sensor 41 that generates an output voltage which is proportional to a depression amount L of an accelerator pedal 40 is connected to the accelerator pedal 40, and the output voltage of the load sensor 41 is input to the input port 35 via the corresponding AD converter 37. Furthermore, a crank angle sensor 42 is connected to the input port 35, and the crank angle sensor 42 generates an output pulse each time a crankshaft rotates by, for example, 15°. The output port 36 is connected to the fuel injection valves 3, the actuator that drives the throttle valve 10, the hydrocarbon supply valve 15, the high pressure EGR control valve 17H, the low pressure EGR control valve 17L, the exhaust throttle valve 29, and the fuel pump 21 via corresponding drive circuits 38.

Figure 2:
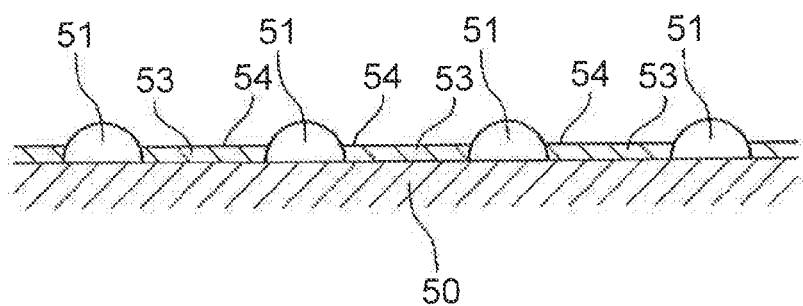
FIG. 2 is a drawing schematically illustrating a surface part of a catalyst carrier.

FIG. 2 schematically shows a surface part of a catalyst carrier that is supported on a substrate of the exhaust gas control catalyst 13 which is illustrated in FIG. 1. In this exhaust gas control catalyst 13, noble metal catalysts 51 consisting of platinum Pt are supported on a catalyst carrier 50 consisting of, for example, alumina and a basic layer 53 is formed on the catalyst carrier 50 as illustrated in FIG. 2. The basic layer 53 contains at least one selected from an alkali metal such as potassium K, sodium Na, and cesium Cs, an alkaline earth metal such as barium Ba and calcium Ca, a rare earth such as lanthanoid, and a metal capable of donating an electron to NOx such as silver Ag, copper Cu, iron Fe, and iridium Ir. Ceria $CeO_2$ is contained in this basic layer 53, and thus the exhaust gas control catalyst 13 has an oxygen storage capacity. In addition, rhodium Rh or palladium Pd can be supported, in addition to the platinum Pt, on the catalyst carrier 50 of the exhaust gas control catalyst 13. Because the exhaust gas flows along the top of the catalyst carrier 50, it can be said that the noble metal catalysts 51 are supported on an exhaust gas flow surface of the exhaust gas control catalyst 13. A surface of the basic layer 53 exhibits basicity, and thus the surface of the basic layer 53 will be referred to as a basic exhaust gas flow surface part 54.

Figure 3:
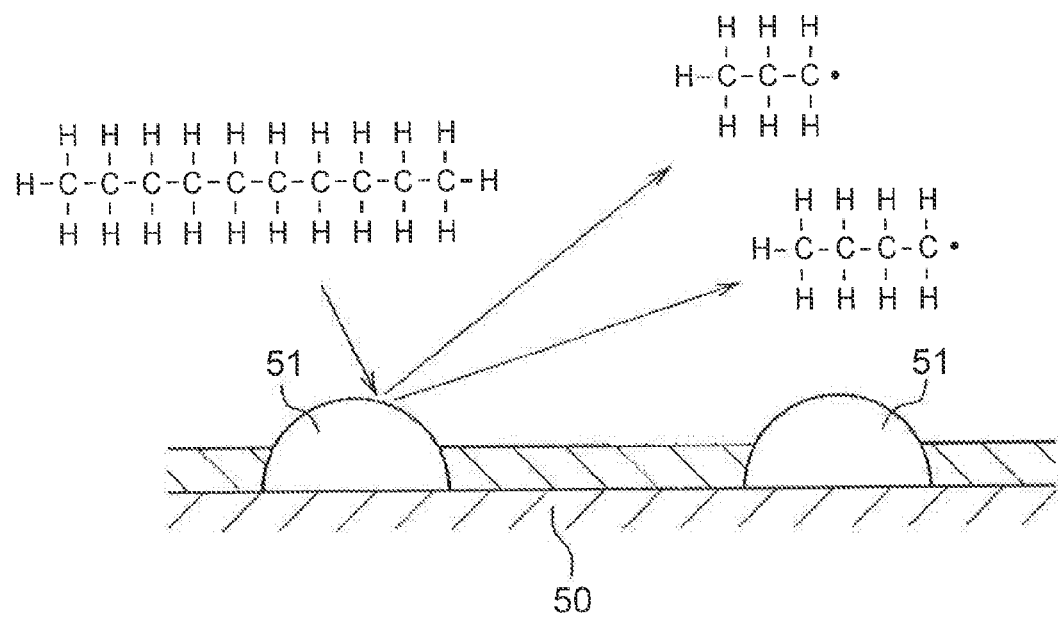
FIG. 3 is a drawing for showing an oxidation reaction in an exhaust gas control catalyst.

When the hydrocarbon is injected into the exhaust gas from the hydrocarbon supply valve 15, the hydrocarbon is reformed in the exhaust gas control catalyst 13. In the invention, NOx is removed in the exhaust gas control catalyst 13 by the use of the hydrocarbon reformed at this time. FIG. 3 schematically shows a reforming action that is performed in the exhaust gas control catalyst 13 at this time. As illustrated in FIG. 3, the hydrocarbon HC injected from the hydrocarbon supply valve 15 is turned into radical hydrocarbons HC with a small carbon number by the noble metal catalysts 51.

Figure 4:
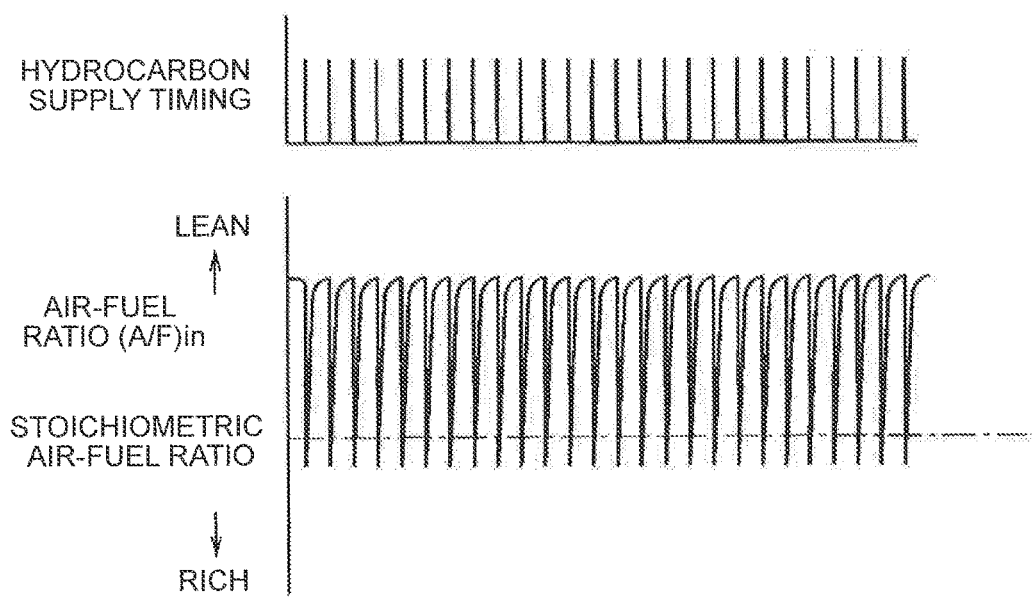
FIG. 4 is a drawing illustrating a change in an air-fuel ratio of exhaust gas flowing into the exhaust gas control catalyst.

FIG. 4 shows a timing of the hydrocarbon supply from the hydrocarbon supply valve 15 and a change in an air-fuel ratio (A/F)in of the exhaust gas flowing into the exhaust gas control catalyst 13. The change in this air-fuel ratio (A/F)in depends on a change in the concentration of the hydrocarbon in the exhaust gas flowing into the exhaust gas control catalyst 13, and thus it can be said that the change in the air-fuel ratio (A/F)in that is illustrated in FIG. 4 represents the change in the concentration of the hydrocarbon. Nevertheless, because the air-fuel ratio (A/F)in decreases as the hydrocarbon concentration increases, the hydrocarbon concentration is higher when the air-fuel ratio (A/F)in is on a rich side in FIG. 4.

Figure 5:
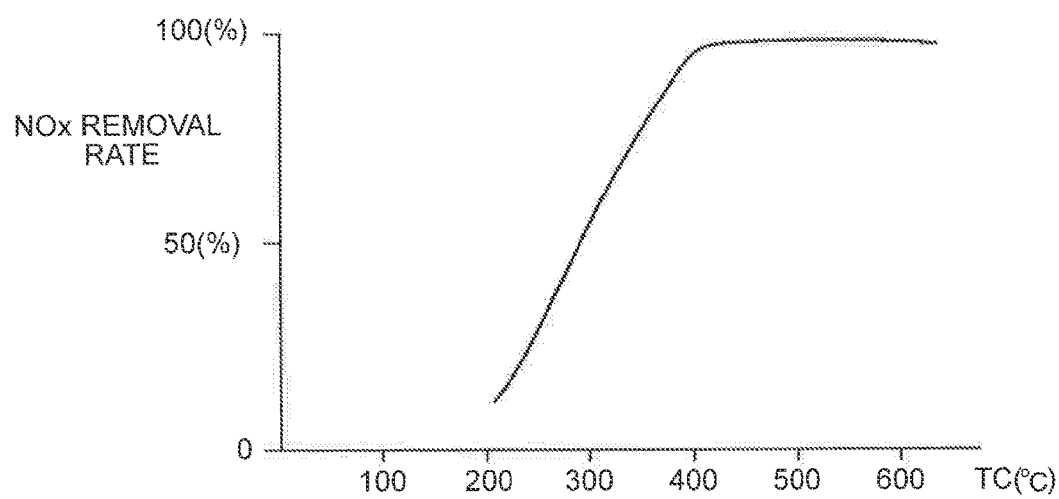
FIG. 5 is a drawing illustrating a NOx removal rate.

FIG. 5 shows, with respect to respective catalyst temperatures TC of the exhaust gas control catalyst 13, a NOx removal rate in the exhaust gas control catalyst 13 at a time when the air-fuel ratio (A/F)in of the exhaust gas flowing into the exhaust gas control catalyst 13 is periodically enriched as illustrated in FIG. 4 by the concentration of the hydrocarbons flowing into the exhaust gas control catalyst 13 being periodically changed. As a result of long-term researches on NOx removal, it has been found that an extremely high NOx removal rate can be obtained, even in a high-temperature region of at least 400° C. as illustrated in FIG. 5, when the concentration of the hydrocarbons flowing into the exhaust gas control catalyst 13 is vibrated at an amplitude within a range determined in advance and a cycle within a range determined in advance.

Figure 6A:
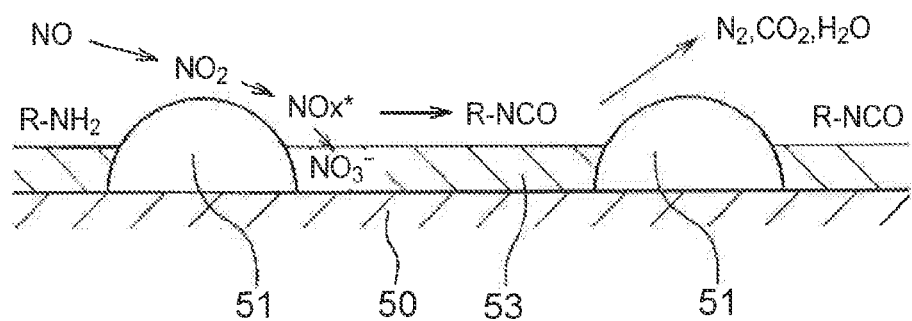
FIGS. 6A and 6B are drawings for showing a redox reaction in the exhaust gas control catalyst.
Figure 6B:
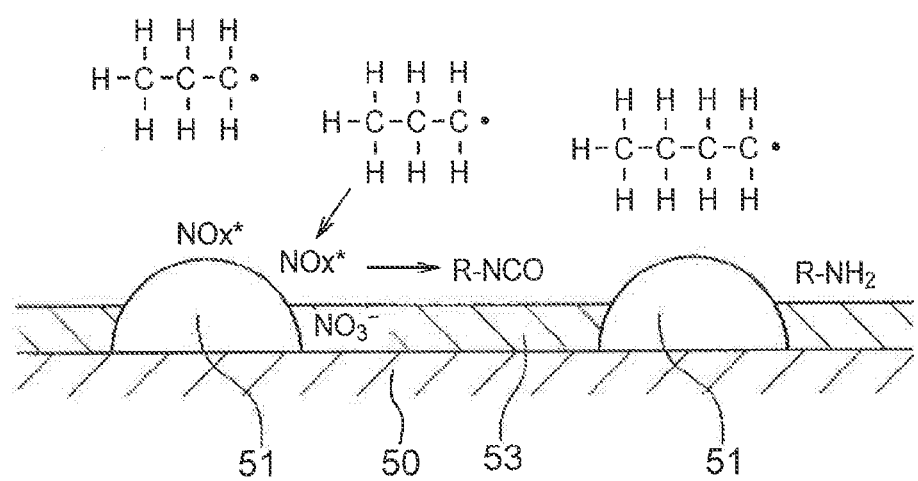

It has also been found that a large amount of reducing intermediates containing nitrogen and hydrocarbons continue to be held or adsorbed on the surface of the basic layer 53, that is, on the basic exhaust gas flow surface part 54 of the exhaust gas control catalyst 13 at this time and the reducing intermediate plays a central role for the achievement of the high NOx removal rate. Hereinafter, this will be described with reference to FIGS. 6A and 6B. FIGS. 6A and 6B schematically show the surface part of the catalyst carrier 50 of the exhaust gas control catalyst 13, and a reaction that is estimated to occur when the concentration of the hydrocarbons flowing into the exhaust gas control catalyst 13 is vibrated at the amplitude within the range determined in advance and the cycle within the range determined in advance is illustrated in FIGS. 6A and 6B.

FIG. 6A shows a time when the concentration of the hydrocarbons flowing into the exhaust gas control catalyst 13 is low, and FIG. 6B shows a time when the air-fuel ratio (A/F)in of the exhaust gas flowing into the exhaust gas control catalyst 13 has become rich with the hydrocarbons supplied from the hydrocarbon supply valve 15, that is, a time when the concentration of the hydrocarbons flowing into the exhaust gas control catalyst 13 is high.

As is apparent from FIG. 4, the air-fuel ratio of the exhaust gas that flows into the exhaust gas control catalyst 13 is maintained lean with the exception of one moment, and thus the exhaust gas that flows into the exhaust gas control catalyst 13 is usually in a hyperoxic state. At this time, some of the NO that is contained in the exhaust gas adheres onto the exhaust gas control catalyst 13, and some of the NO that is contained in the exhaust gas becomes $NO_2$ after being oxidized on the platinum 51 as illustrated in FIG. 6A. Then, this $NO_2$ is further oxidized and becomes $NO_3$. In addition, some of the $NO_2$ becomes $NO_2{-}$. Accordingly, $NO_2{-}$ and $NO_3$ are generated on the platinum Pt 51. The NO adhering on the exhaust gas control catalyst 13 and the $NO_2{-}$ and the $NO_3$ generated on the platinum Pt 51 have high levels of activity, and thus these NO, $NO_2{-}$, and $NO_3$ will be referred to as active NOx* hereinbelow.

When the air-fuel ratio (A/F)in of the exhaust gas flowing into the exhaust gas control catalyst 13 is enriched with the hydrocarbon supplied from the hydrocarbon supply valve 15, this hydrocarbon adheres to the entire exhaust gas control catalyst 13 in order. Most of these adhering hydrocarbons react with oxygen and are burned in order, and some of the adhering hydrocarbons are reformed in the exhaust gas control catalyst 13 and become radical in order as illustrated in FIG. 3. Accordingly, the hydrocarbon concentration around the active NOx* increases as illustrated in FIG. 6B. When a state where the concentration of the oxygen around the active NOx* is high continues for a certain period of time or longer after the active NOx* generation, the active NOx* is oxidized and is absorbed into the basic layer 53 in the form of a nitrate ion $NO_3{-}$. When the hydrocarbon concentration around the active NOx* is increased before the elapse of the certain period of time, however, the active NOx* reacts with the radical hydrocarbon HC on the platinum 51 and then the reducing intermediate is generated as illustrated in FIG. 6B. This reducing intermediate adheres or is adsorbed onto the surface of the basic layer 53.

It is conceivable that the reducing intermediate that is first generated at this time is a nitro compound R—$NO_2$. Once generated, this nitro compound R—$NO_2$ becomes a nitrile compound R—CN. However, this nitrile compound R—CN can survive only for an instant in that state, and immediately becomes an isocyanate compound R—NCO. When hydrolyzed, this isocyanate compound R—NCO becomes an amine compound R—$NH_2$. In this case, however, it is conceivable that it is a part of the isocyanate compound R—NCO that is hydrolyzed. Accordingly, it is conceivable that most of the reducing intermediates held or adsorbed on the surface of the basic layer 53 are the isocyanate compound R—NCO and the amine compound R—$NH_2$ as illustrated in FIG. 6B.

When the hydrocarbons HC adhere around the generated reducing intermediates as illustrated in FIG. 6B, the reducing intermediates are hampered by the hydrocarbons HC and no further reaction proceeds. In this case, the concentration of the hydrocarbons flowing into the exhaust gas control catalyst 13 declines, and then the hydrocarbons adhering around the reducing intermediates are oxidized and disappear. Once the concentration of the oxygen around the reducing intermediates increases as a result, the reducing intermediates react with the NOx and the active NOx* in the exhaust gas, react with the ambient oxygen, or autolyze. Then, the reducing intermediates R—NCO and R—$NH_2$ are converted to $N_2$, $CO_2$, and $H_2O$ as illustrated in FIG. 6A, which causes the NOx to be removed.

As described above, in the exhaust gas control catalyst 13, the reducing intermediates are generated by the concentration of the hydrocarbons flowing into the exhaust gas control catalyst 13 being increased, the reducing intermediates react with the NOx, active NOx*, and oxygen in the exhaust gas or autolyze when the oxygen concentration is increased after the decline in the concentration of the hydrocarbons flowing into the exhaust gas control catalyst 13, and then the NOx is removed. In other words, when the NOx is removed by the exhaust gas control catalyst 13, the concentration of the hydrocarbons flowing into the exhaust gas control catalyst 13 needs to be periodically changed.

As a matter of course, in this case, the hydrocarbon concentration needs to be raised to a concentration that is sufficiently high for the reducing intermediate generation and the hydrocarbon concentration needs to be lowered to a concentration that is sufficiently low for the generated reducing intermediates to react with the NOx, active NOx*, and oxygen in the exhaust gas or autolyze. In other words, the concentration of the hydrocarbons flowing into the exhaust gas control catalyst 13 is required to be vibrated at the amplitude within the range determined in advance. In this case, these reducing intermediates should be held on the basic layer 53, that is, on the basic exhaust gas flow surface part 54, until the generated reducing intermediates R—NCO and R—$NH_2$ react with the NOx, active NOx*, and oxygen in the exhaust gas or autolyze. This is a reason why the basic exhaust gas flow surface part 54 is disposed.

When the hydrocarbon supply cycle is extended, a period in which the oxygen concentration increases between the hydrocarbon supply and the next hydrocarbon supply is lengthened, and thus the active NOx* is absorbed into the basic layer 53 in the form of nitrate without generating the reducing intermediate. For this to be avoided, the concentration of the hydrocarbons flowing into the exhaust gas control catalyst 13 needs to be vibrated at the cycle within the range determined in advance.

In the example according to the invention, the noble metal catalysts 51 are supported on the exhaust gas flow surface of the exhaust gas control catalyst 13 so that the reducing intermediates R—NCO and R—$NH_2$ containing the nitrogen and the hydrocarbons are generated by the NOx contained in the exhaust gas and the reformed hydrocarbons reacting with each other, the noble metal catalysts 51 includes the basic exhaust gas flow surface part 54 so that the generated reducing intermediates R—NCO and R—$NH_2$ are held in the exhaust gas control catalyst 13, the reducing intermediates R—NCO and R—$NH_2$ held on the basic exhaust gas flow surface part 54 are converted to $N_2$, $CO_2$, and $H_2O$, and the hydrocarbon concentration vibration cycle is a vibration cycle that is required for the generation of the reducing intermediates R—NCO and R—NH$_2$ to continue. In this regard, the example that is illustrated in FIG. 4 has an injection interval of three seconds.

Figure 7A:
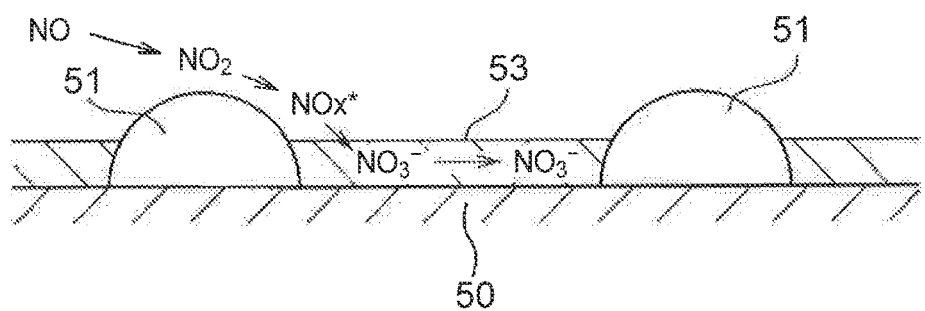
FIGS. 7A and 7B are drawings for showing the redox reaction in the exhaust gas control catalyst.

When the cycle of the vibration of the hydrocarbon concentration, that is, the cycle of the injection of the hydrocarbons HC from the hydrocarbon supply valve 15, exceeds the cycle within the range determined in advance described above, the reducing intermediates R—NCO and R—NH$_2$ disappear from the top of the surface of the basic layer 53. At this time, the active NOx* generated on the platinum Pt 51 diffuses in the basic layer 53 in the form of the nitrate ion NO$_3$— as illustrated in FIG. 7A and becomes nitrate. In other words, at that time, the NOx in the exhaust gas is absorbed into the basic layer 53 in the form of nitrate.

Figure 7B:
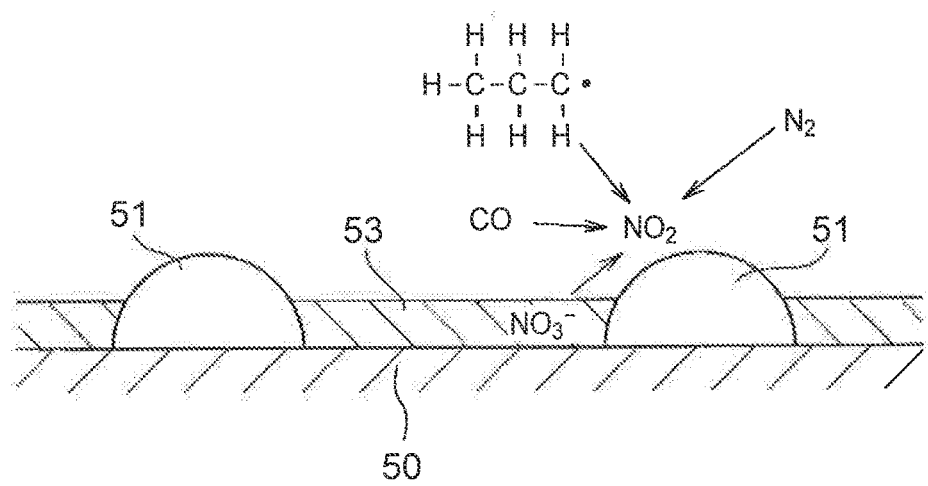

FIG. 7B shows a case where the air-fuel ratio of the exhaust gas flowing into the exhaust gas control catalyst 13 becomes a stoichiometric air-fuel ratio or is enriched when the NOx is absorbed into the basic layer 53 in the form of the nitrate as described above. In this case, the concentration of the oxygen in the exhaust gas declines, and thus the reaction proceeds in the reverse direction (NO$_3$—→NO$_2$). Accordingly, the nitrates absorbed in the basic layer 53 become the nitrate ions NO$_3$— in order and are released from the basic layer 53 in the form of NO$_2$ as illustrated in FIG. 7B. Then, the released NO$_2$ is reduced by the hydrocarbons HC and CO contained in the exhaust gas.

Figure 8:
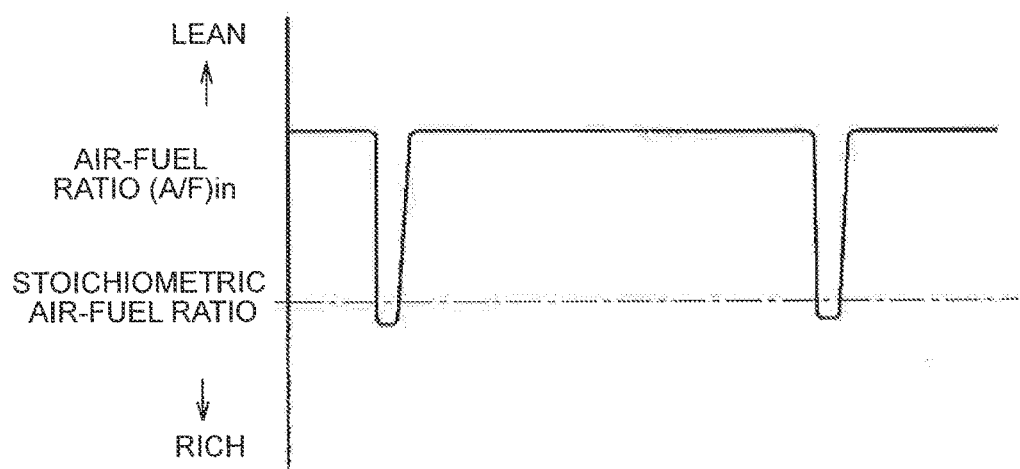
FIG. 8 is a drawing illustrating a change in the air-fuel ratio of the exhaust gas flowing into the exhaust gas control catalyst.

FIG. 8 shows a case where the air-fuel ratio (A/F)in of the exhaust gas flowing into the exhaust gas control catalyst 13 is temporarily enriched shortly before the saturation of the NOx absorption capacity of the basic layer 53. In the example that is illustrated in FIG. 8, this rich control has a time interval of at least one minute. In this case, the NOx absorbed into the basic layer 53 when the air-fuel ratio (A/F)in of the exhaust gas is lean is released at once from the basic layer 53 and is reduced when the air-fuel ratio (A/F)in of the exhaust gas is temporarily enriched. Accordingly, in this case, the basic layer 53 plays the role of an absorbent for temporary NOx absorption.

At this time, the basic layer 53 temporarily adsorbs the NOx in some cases. Accordingly, using the term of storage as a term including both absorption and adsorption, the basic layer 53 at this time plays the role of a NOx storing agent for temporary NOx storage. In other words, referring to the ratio of the air and the fuel (hydrocarbon) supplied into the engine intake passage, the combustion chambers 2, and the exhaust passage on the upstream side of the exhaust gas control catalyst 13 as the air-fuel ratio of the exhaust gas, the exhaust gas control catalyst 13 in this case functions as a NOx storage catalyst that stores the NOx when the air-fuel ratio of the exhaust gas is lean and releases the stored NOx once the oxygen concentration in the exhaust gas declines.

Figure 9:
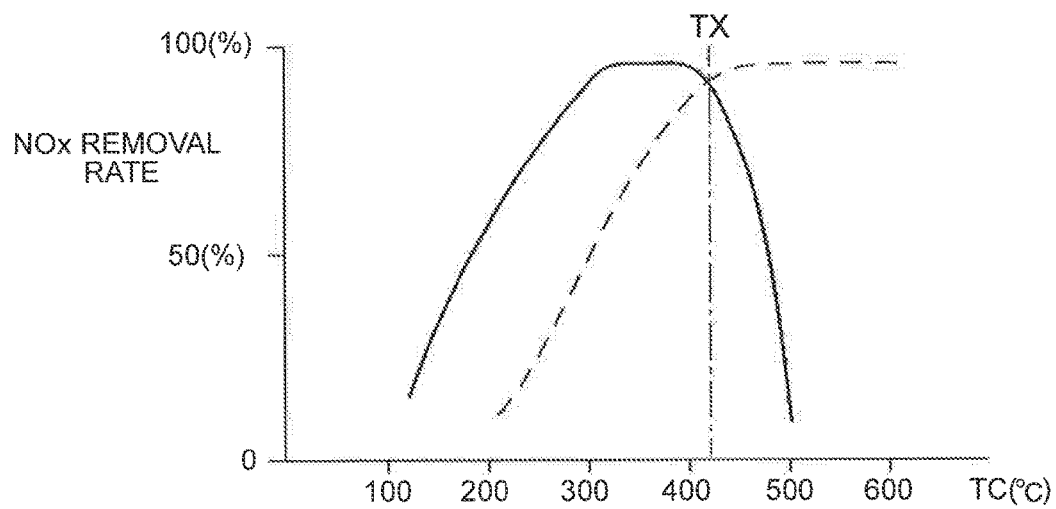
FIG. 9 is a drawing illustrating the NOx removal rate.

The solid line in FIG. 9 represents the NOx removal rate at a time when the exhaust gas control catalyst 13 is allowed to function as the NOx storage catalyst as described above. The horizontal axis in FIG. 9 represents the catalyst temperature TC of the exhaust gas control catalyst 13. In a case where the exhaust gas control catalyst 13 is allowed to function as the NOx storage catalyst as described above, an extremely high NOx removal rate can be obtained when the catalyst temperature TC is 300° C. to 400° C. but the NOx removal rate declines once the catalyst temperature TC reaches a high temperature of at least 400° C. as illustrated with the solid line in FIG. 9. In FIG. 9, the NOx removal rate that is illustrated in FIG. 5 is illustrated with a dashed line.

The above-described decline in the NOx removal rate at the catalyst temperature TC of 400° C. or higher is because the nitrate is thermally decomposed and is released from the exhaust gas control catalyst 13 in the form of NO$_2$ once the catalyst temperature TC becomes equal to or higher than 400° C. In other words, it is difficult to obtain a high NOx removal rate when the catalyst temperature TC is high insofar as the NOx is stored in the form of the nitrate. By the novel NOx removal control that is illustrated in FIGS. 4 to 6B, however, no nitrate is generated or an extremely small amount of the nitrate is generated even if the nitrate is generated as is apparent from FIGS. 6A and 6B, and thus a high NOx removal rate can be obtained as illustrated in FIG. 5 even when the catalyst temperature TC is high.

In the example according to the invention, the hydrocarbon supply valve 15 for supplying the hydrocarbons is disposed in the engine exhaust passage, the exhaust gas control catalyst 13 is disposed in the engine exhaust passage on the downstream side of the hydrocarbon supply valve 15, the noble metal catalysts 51 are supported on the exhaust gas flow surface of the exhaust gas control catalyst 13, and the noble metal catalysts 51 includes the basic exhaust gas flow surface part 54 so that NOx is removed by the use of this novel NOx removal control. The exhaust gas control catalyst 13 has the property of reducing the NOx that is contained in the exhaust gas when the concentration of the hydrocarbons flowing into the exhaust gas control catalyst 13 is vibrated at the amplitude within the range determined in advance and the cycle within the range determined in advance and the property of having an increasing amount of storage of the NOx contained in the exhaust gas when the hydrocarbon concentration vibration cycle exceeds this range determined in advance. While the engine is in operation, the hydrocarbons are injected from the hydrocarbon supply valve 15 at a cycle determined in advance, and then the NOx contained in the exhaust gas is reduced in the exhaust gas control catalyst 13.

In other words, it can be said that the NOx removal control that is illustrated in FIGS. 4 to 6B is a novel NOx removal control by which the NOx is removed with little nitrate formation in a case where the exhaust gas control catalyst where the basic layer is formed to be capable of supporting the noble metal catalyst and absorbing the NOx is used. In actuality, compared to a case where the exhaust gas control catalyst 13 is allowed to function as the NOx storage catalyst, the nitrate that is detected from the basic layer 53 has an extremely small amount in a case where this novel NOx removal control is used. Hereinafter, this novel NOx removal control will be referred to as a first NOx removal control.

Figure 10:
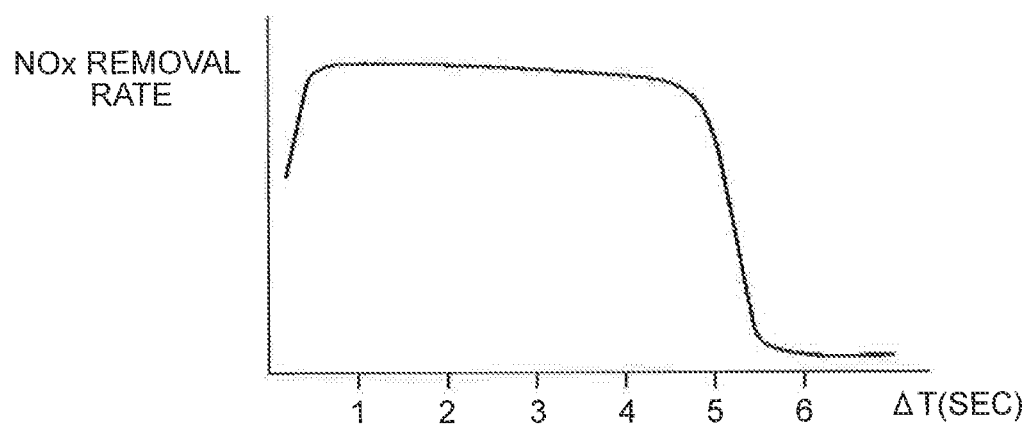
FIG. 10 is a drawing illustrating a relationship between a hydrocarbon injection cycle ΔT and the NOx removal rate.

As described above, when the cycle ΔT of the hydrocarbon injection from the hydrocarbon supply valve 15 is extended, the period in which the oxygen concentration around the active NOx* increases is lengthened between the hydrocarbon injection and the next hydrocarbon injection. In this case, in the example that is illustrated in FIG. 1, the active NOx* begins to be absorbed into the basic layer 53 in the form of the nitrate once the hydrocarbon injection cycle ΔT exceeds approximately five seconds. Accordingly, as illustrated in FIG. 10, the NOx removal rate declines once the hydrocarbon concentration vibration cycle ΔT exceeds approximately five seconds. Hence, in the example that is illustrated in FIG. 1, the hydrocarbon injection cycle ΔT is required to be five seconds or less.

In the example according to the invention, the injected hydrocarbons begin to be deposited on the exhaust gas flow surface of the exhaust gas control catalyst 13 once the hydrocarbon injection cycle ΔT becomes approximately 0.3 seconds or less. Accordingly, as illustrated in FIG. 10, the NOx removal rate declines once the hydrocarbon injection cycle ΔT becomes approximately 0.3 seconds or less. In this regard, in the example according to the invention, the hydrocarbon injection cycle is between 0.3 seconds and five seconds.

Figure 11:
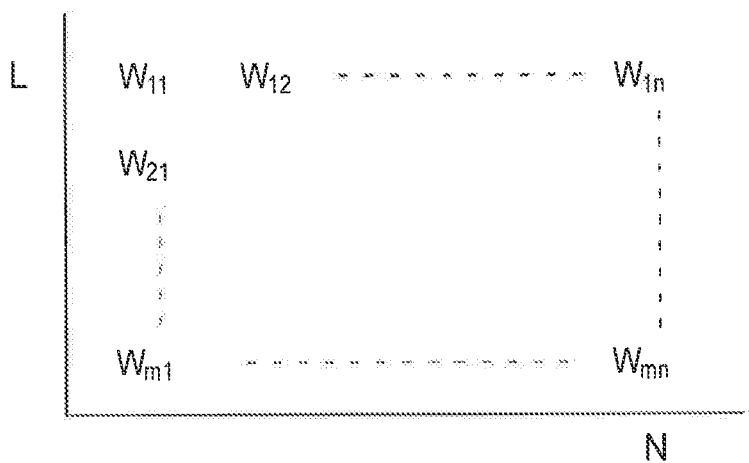
FIG. 11 is a map illustrating a hydrocarbon injection quantity.

In the example according to the invention, the air-fuel ratio (A/F)in of the exhaust gas flowing into the exhaust gas control catalyst 13 and the injection cycle ΔT are controlled to have optimum values in accordance with engine operation states by the quantity and timing of the hydrocarbon injection from the hydrocarbon supply valve 15 being changed. In this case, in the example according to the invention, an optimal hydrocarbon injection quantity W at a time when a NOx removal action according to the first NOx removal control is performed is stored in advance in the ROM 32 in the form of the map which is illustrated in FIG. 11 and as a function of the depression amount L of the accelerator pedal 40 and an engine rotation speed N and an optimal hydrocarbon injection cycle ΔT at that time is also stored in advance in the ROM 32 in the form of a map and as the function of the depression amount L of the accelerator pedal 40 and the engine rotation speed N.

Hereinafter, a NOx removal control in a case where the exhaust gas control catalyst 13 is allowed to function as the NOx storage catalyst will be described in detail with reference to FIGS. 12 to 15. The NOx removal control in the case where the exhaust gas control catalyst 13 is allowed to function as the NOx storage catalyst as described above will be referred to as a second NOx removal control hereinbelow.

Figure 12:
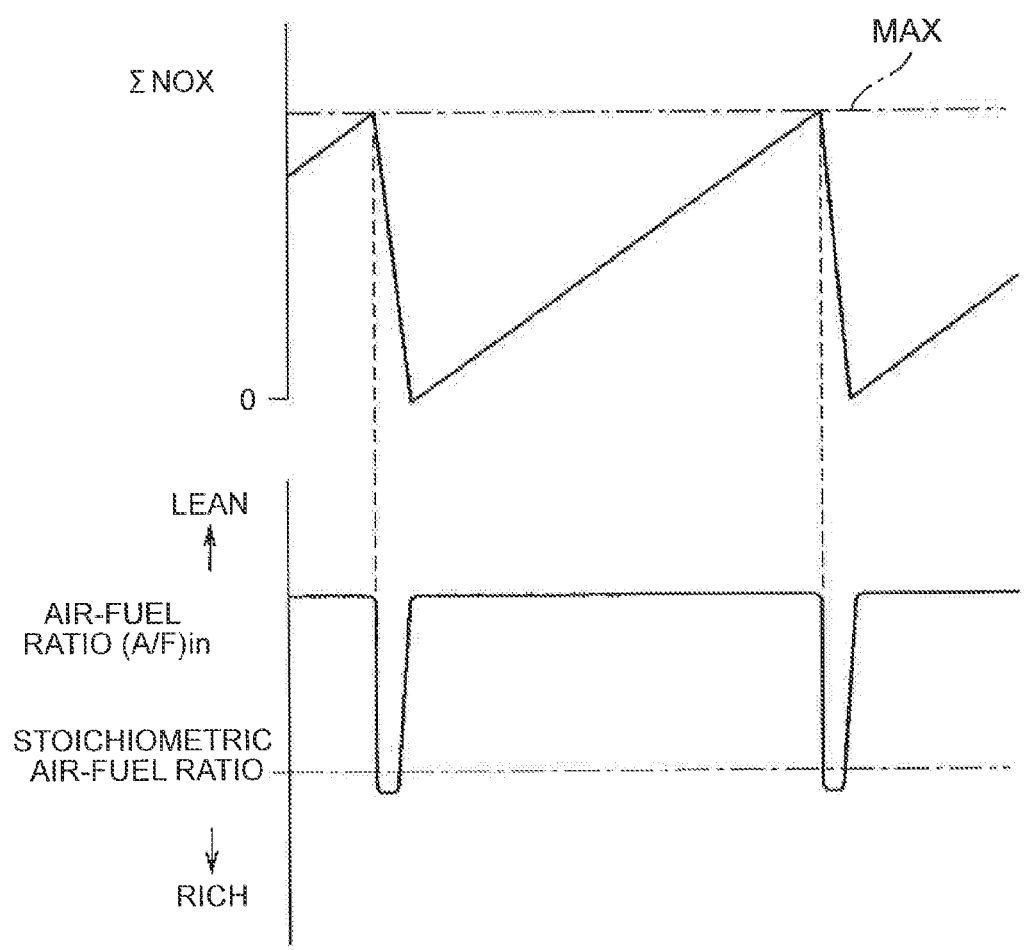
FIG. 12 is a drawing illustrating a NOx release control.

In this second NOx removal control, the air-fuel ratio (A/F)in of the exhaust gas flowing into the exhaust gas control catalyst 13 is temporarily enriched, as illustrated in FIG. 12, when the amount ΣNOX of the NOx stored in the basic layer 53 exceeds an allowable amount MAX determined in advance. Once the air-fuel ratio (A/F)in of the exhaust gas is enriched, the NOx stored in the basic layer 53 when the air-fuel ratio (A/F)in of the exhaust gas is lean is released at once from the basic layer 53 and is reduced. This causes the NOx to be removed.

Figure 13:
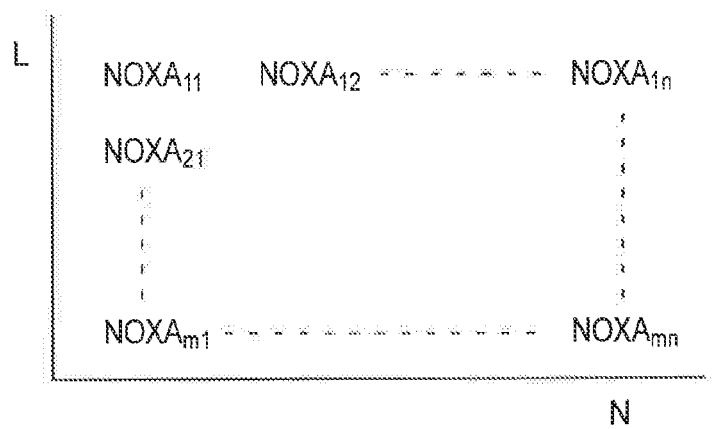
FIG. 13 is a drawing illustrating a map of a discharged NOx amount NOXA.

The stored NOx amount ΣNOX is calculated from, for example, the amount of the NOx that is discharged from the engine. In the example according to the invention, the amount NOXA of the NOx discharged from the engine per unit time is stored in advance in the ROM 32 in the form of the map which is illustrated in FIG. 13 and as the function of the depression amount L of the accelerator pedal 40 and the engine rotation speed N, and the stored NOx amount ΣNOX is calculated from this discharged NOx amount NOXA. In this case, the cycle in which the air-fuel ratio (A/F)in of the exhaust gas is enriched as described above is usually at least one minute.

Figure 14:
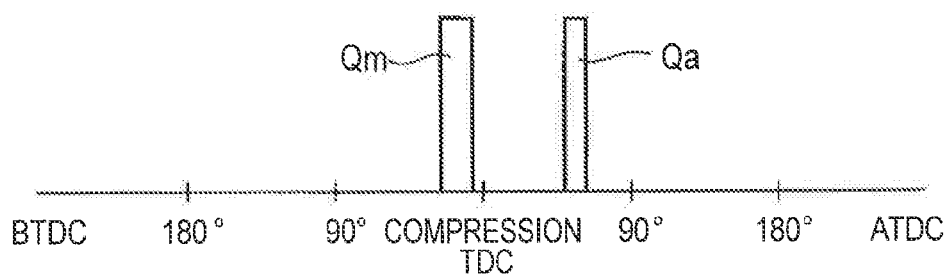
FIG. 14 is a drawing illustrating a fuel injection timing.
Figure 15:
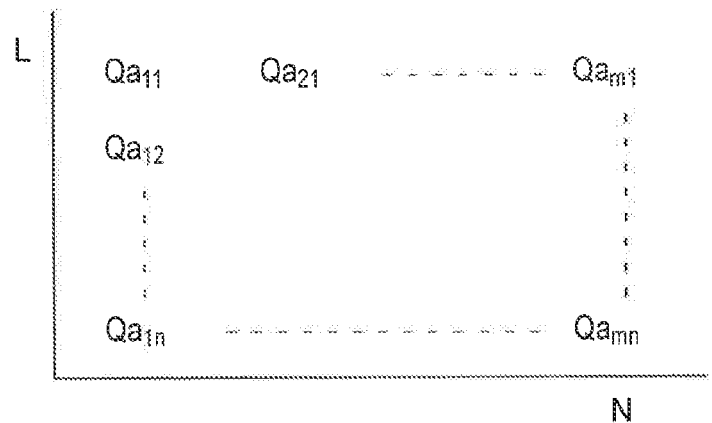
FIG. 15 is a drawing illustrating a map of an additional fuel amount Qa.

According to the second NOx removal control, the air-fuel ratio (A/F)in of the exhaust gas flowing into the exhaust gas control catalyst 13 is enriched by an additional fuel Qa as well as a fuel for combustion, that is, a main fuel Qm, being injected from the fuel injection valves 3 into the combustion chambers 2 as illustrated in FIG. 14. The horizontal axis in FIG. 14 represents a crank angle. As an example, this additional fuel Qa is injected after a compression top dead center and slightly before the ATDC 90°. This additional fuel amount Qa is stored in advance in the ROM 32 in the form of the map which is illustrated in FIG. 15 and as the function of the depression amount L of the accelerator pedal 40 and the engine rotation speed N.

In the example according to the invention, the NOx removal action according to the first NOx removal control and a NOx removal action according to the second NOx removal control are selectively performed. Whether to perform the NOx removal action according to the first NOx removal control or the NOx removal action according to the second NOx removal control is determined, for example, as follows. In other words, the NOx removal rate at a time when the NOx removal action according to the first NOx removal control is performed begins to decline rapidly, as illustrated in FIG. 5, once the temperature TC of the exhaust gas control catalyst 13 becomes equal to or lower than a limit temperature TX. In contrast, the NOx removal rate at a time when the NOx removal action according to the second NOx removal control is performed declines relatively slowly, as illustrated in FIG. 9, when the temperature TC of the exhaust gas control catalyst 13 declines. Accordingly, in the example according to the invention, the NOx removal action according to the first NOx removal control is performed when the temperature TC of the exhaust gas control catalyst 13 is higher than the limit temperature TX and the NOx removal action according to the second NOx removal control is performed when the temperature TC of the exhaust gas control catalyst 13 is lower than the limit temperature TX.

Referring to the ratio of the amount GeH of the EGR gas that is supplied from the high pressure EGR passage 16H into the combustion chambers 2 to a total amount G of the gas that is supplied into the combustion chambers 2 as a high pressure EGR rate REGRH (=GeH/G), the actual high pressure EGR rate REGRH is calculated and an opening degree VEGRH of the high pressure EGR control valve 17H is controlled in the example according to the invention such that the actual high pressure EGR rate REGRH corresponds to a target high pressure EGR rate REGRHT. In addition, referring to the ratio of the amount GeL of the EGR gas that is supplied from the low pressure EGR passage 16L into the combustion chambers 2 to the total amount G of the gas that is supplied into the combustion chambers 2 as a low pressure EGR rate REGRL (=GeL/G), the actual low pressure EGR rate REGRL is calculated and an opening degree VEGRL of the low pressure EGR control valve 17L and an opening degree of the exhaust throttle valve 29 are controlled in the example according to the invention such that the actual low pressure EGR rate REGRL corresponds to a target low pressure EGR rate REGRLT.

The total amount G of the gas that is supplied into the combustion chambers 2 is calculated based on the intake pressure detected by the pressure sensor 4p. The amount GeH of the EGR gas from the high pressure EGR passage 16H is calculated based on the intake pressure detected by the pressure sensor 4p, the exhaust pressure detected by the pressure sensor 5p, and the opening degree of the high pressure EGR control valve 17H. The amount GeL of the EGR gas from the low pressure EGR passage 16L is calculated based on the pressure detected by the pressure sensor 8p, a pressure detected by a pressure sensor 17p, and the opening degree of the low pressure EGR control valve 17L. Accordingly, the high pressure EGR rate REGRH and the low pressure EGR rate REGRL are calculated. A total amount Ge of the EGR gas that is supplied into the combustion chambers 2 is represented by GeH+GeL, and thus an EGR rate REGR, which is the ratio of the total amount of the EGR gas that is supplied into the combustion chambers 2 to the total amount of the gas that is supplied into the combustion chambers 2, is represented by Ge/G.

In the example according to the invention, the rich control for temporarily declining the air-fuel ratio of the exhaust gas that is discharged from the combustion chambers 2 is performed so that the air-fuel ratio (A/F)in of the exhaust gas flowing into the exhaust gas control catalyst 13 is enriched with regard to the second NOx removal control as described above. In this case, the rich control is performed by the additional fuel Qa being injected into the combustion chambers 2. In a case where the hydrocarbon is not supplied from the hydrocarbon supply valve 15, the air-fuel ratio (A/F)in of the exhaust gas flowing into the exhaust gas control catalyst 13 corresponds to the air-fuel ratio of the exhaust gas that is discharged from the combustion chambers 2.

Figure 16:
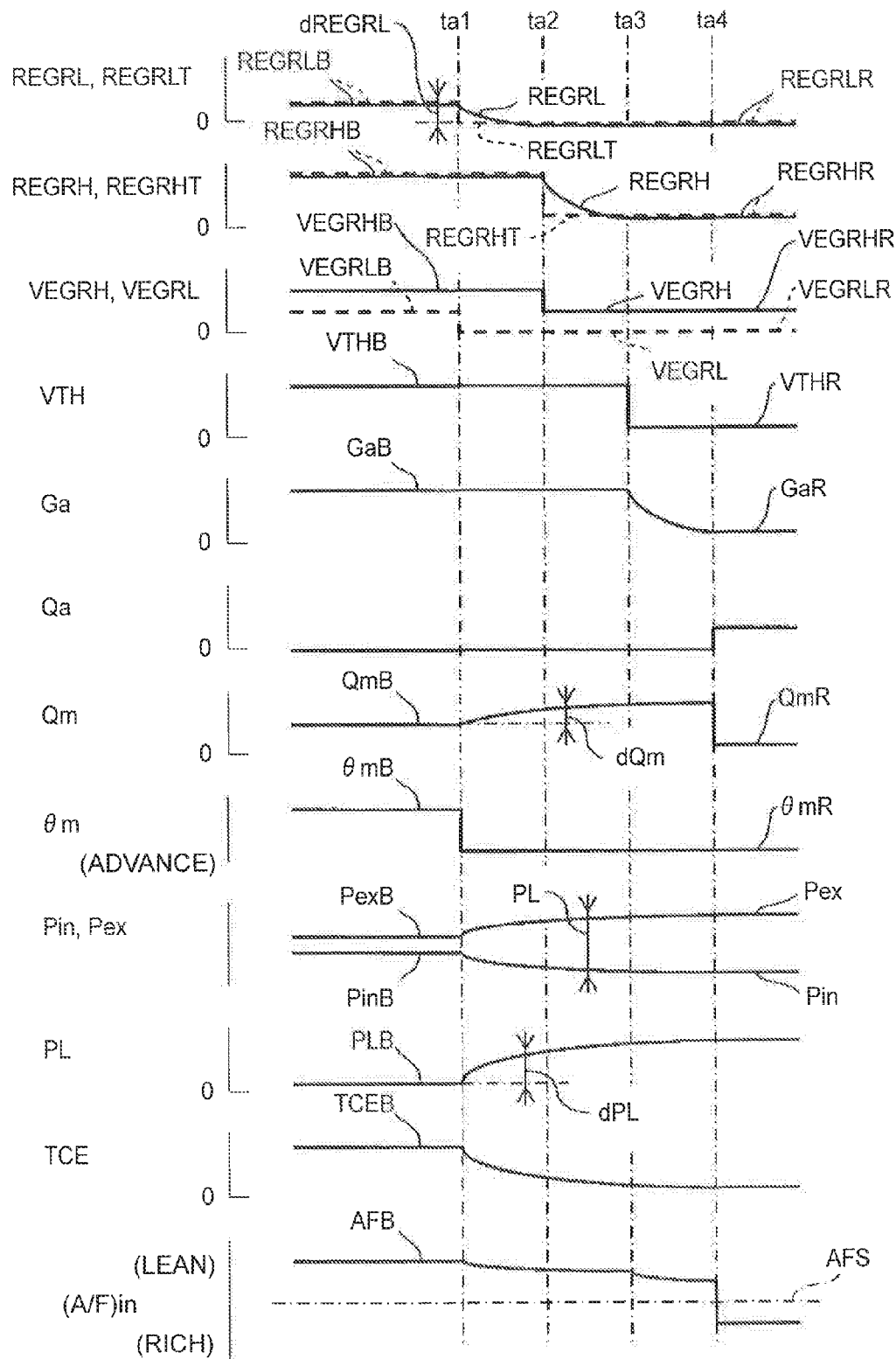
FIG. 16 is a time chart showing a time when a rich control is initiated.

FIG. 16 is a time chart showing a time when the rich control is initiated. Time ta1 in FIG. 16 represents a timing at which a signal is issued for the initiation of the rich control.

Before time ta1, that is, during a normal control in which the rich control is not performed, the target low pressure EGR rate REGRLT and the target high pressure EGR rate REGRHT are set to a base low pressure EGR rate REGRLB and a base high pressure EGR rate REGRHB, respectively. In other words, the low pressure EGR control valve opening degree VEGRL becomes a base low pressure EGR control valve opening degree VEGRLB that is required for the actual low pressure EGR rate REGRL to become the base low pressure EGR rate REGRLB, and the high pressure EGR control valve opening degree VEGRH becomes a base high pressure EGR control valve opening degree VEGRHB that is required for the actual high pressure EGR rate REGRH to become the base high pressure EGR rate REGRHB. As a result, the low pressure EGR rate REGRL and the high pressure EGR rate REGRH become the base low pressure EGR rate REGRLB and the base high pressure EGR rate REGRHB, respectively. The base low pressure EGR rate REGRLB and the base high pressure EGR rate REGRHB are stored in advance in the ROM 32 as the function of the depression amount L of the accelerator pedal 40 and the engine rotation speed N and in the form of the maps which are illustrated in FIGS. 17 and 18, respectively.

In addition, a throttle opening degree VTH is set to a base throttle opening degree VTHB. As a result, a suctioned air amount Ga becomes a base suctioned air amount GaB that is determined in accordance with the base throttle opening degree VTHB. The base throttle opening degree VTHB is stored in advance in the ROM 32 in the form of the map which is illustrated in FIG. 19 and as the function of the depression amount L of the accelerator pedal 40 and the engine rotation speed N.

Furthermore, the additional fuel amount Qa is set to zero. In other words, the additional fuel Qa is not injected. As a result, the air-fuel ratio (A/F)in of the exhaust gas becomes a base air-fuel ratio AFB that is leaner than a stoichiometric air-fuel ratio AFS.

Moreover, the main fuel Qm is set to a base main fuel amount QmB. The base main fuel amount QmB is the amount of the fuel that is required for the generation of a required output. The base main fuel amount QmB is stored in advance in the ROM 32 in the form of the map which is illustrated in FIG. 20 and as the function of the depression amount L of the accelerator pedal 40 and the engine rotation speed N.

Moreover, a main fuel injection timing θm is set to a base injection timing θmB. The base injection timing θmB is stored in advance in the ROM 32 in the form of the map which is illustrated in FIG. 21 and as the function of the depression amount L of the accelerator pedal 40 and the engine rotation speed N.

In this case, an intake pressure Pin becomes a base intake pressure PinB and an exhaust pressure Pex becomes a base exhaust pressure PexB. Accordingly, a pump loss PL (=Pex-Pin) that is represented by the difference between the exhaust pressure Pex and the intake pressure Pin becomes a base pump loss PLB (=PexB-PinB). Considering that the intake pressure Pin and the exhaust pressure Pex are determined in accordance with the throttle opening degree VTH, the low pressure EGR rate REGRL, and the high pressure EGR rate REGRH, the base pump loss PLB is determined in accordance with the base throttle opening degree VTHB, the base low pressure EGR rate REGRLB, and the base high pressure EGR rate REGRHB.

A compression end temperature TCE becomes a base compression end temperature TCEB. Considering that the compression end temperature TCE is determined in accordance with an in-cylinder gas amount and the in-cylinder gas amount is determined in accordance with the throttle opening degree VTH, the low pressure EGR rate REGRL, and the high pressure EGR rate REGRH, the base compression end temperature TCEB is determined in accordance with the base throttle opening degree VTHB, the base low pressure EGR rate REGRLB, and the base high pressure EGR rate REGRHB.

Once the signal for the initiation of the rich control is issued at time ta1, the target low pressure EGR rate REGRLT is first switched from the base low pressure EGR rate REGRLB to a low pressure EGR rate REGRLR for the rich control that is different from the base low pressure EGR rate REGRLB. Then, the low pressure EGR control valve opening degree VEGRL is switched from the base low pressure EGR control valve opening degree VEGRLB to a low pressure EGR control valve opening degree VEGRLR for the rich control. In the example that is illustrated in FIG. 16, the target low pressure EGR rate REGRLT is reduced to zero, and thus the low pressure EGR control valve opening degree VEGRL is reduced to zero. The low pressure EGR rate REGRLR for the rich control is stored in advance in the ROM 32 in the form of the map which is illustrated in FIG. 22 and as the function of the depression amount L of the accelerator pedal 40 and the engine rotation speed N.

At this time, the target high pressure EGR rate REGRHT is maintained at the base high pressure EGR rate REGRHB, and thus the high pressure EGR control valve opening degree VEGRH is maintained at the base high pressure EGR control valve opening degree VEGRHB. Accordingly, the high pressure EGR rate REGRH is maintained at the base high pressure EGR rate REGRHB.

In addition, the throttle opening degree VTH is maintained at the base throttle opening degree VTHB as well. Accordingly, the suctioned air amount Ga is maintained at the base suctioned air amount GaB.

Furthermore, the additional fuel amount Qa is maintained at zero. In other words, the injection of the additional fuel Qa has yet to be initiated.

As a result, the EGR gas amount decreases, and thus the intake pressure Pin declines from the base intake pressure PinB. In addition, since the EGR gas amount decreases, the exhaust gas temperature rises, and thus the exhaust pressure Pex rises from the base exhaust pressure PexB. Accordingly, the pump loss PL increases from the base pump loss PLB. As a result, an engine output temporarily declines when the rich control is initiated, and an engine output fluctuation might increase. In this regard, in the example that is illustrated in FIG. 16, the main fuel amount Qm is increased by an increment dQm with respect to the base main fuel amount QmB. As a result, an increase in the engine output fluctuation at a time of the initiation of the rich control is blocked.

Figure 27:
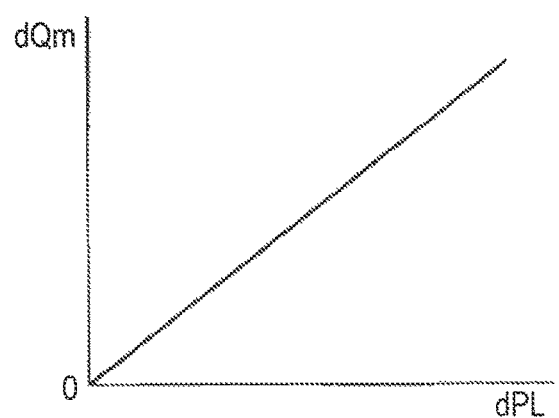
FIG. 27 is a drawing illustrating a map of a main fuel increment dQm.

The increment dQm is set based on a deviation dPL of the pump loss PL with respect to the base pump loss PLB (=PL−PLB). Specifically, the increment dQm is set to decrease as the deviation dPL decreases. The increment dQm is stored in advance in the ROM 32 in the form of the map which is illustrated in FIG. 27.

As a result, the air-fuel ratio (A/F)in of the exhaust gas declines by the increment dQm of the main fuel Qm as illustrated in FIG. 16.

Figure 26:
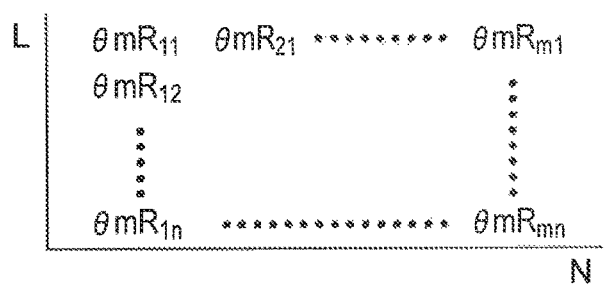
FIG. 26 is a drawing illustrating a map of a main fuel injection timing θmR for the rich control.

In addition, the in-cylinder gas amount decreases, and thus the compression end temperature TCE declines from the base compression end temperature TCEB. As a result, a timing of the combustion of the main fuel Qm is delayed. Accordingly, the engine output temporarily declines when the rich control is initiated, and the engine output fluctuation might increase. In this regard, in the example that is illustrated in FIG. 16, the main fuel injection timing θm is switched from the base main fuel injection timing θmB to an injection timing θmR for the rich control. In the example that is illustrated in FIG. 16, the main fuel injection timing θm is advanced. As a result, the timing of the combustion of the main fuel Qm is advanced, and the increase in the engine output fluctuation immediately after a termination of the rich control is blocked. The injection timing θmR for the rich control is stored in advance in the ROM 32 in the form of the map which is illustrated in FIG. 26 and as the function of the depression amount L of the accelerator pedal 40 and the engine rotation speed N.

In the example that is illustrated in FIG. 16, the low pressure EGR rate REGRLR for the rich control is set to zero. In other words, the EGR gas supply from the low pressure EGR passage 16L is stopped during the rich control. In another example, the low pressure EGR rate REGRLR for the rich control is set to exceed zero and the EGR gas is supplied from the low pressure EGR passage 16L during the rich control.

Then, once the low pressure EGR rate REGRL is switched to the low pressure EGR rate REGRLR for the rich control at time ta2, the target high pressure EGR rate REGRHT is switched from the base high pressure EGR rate REGRHB to a high pressure EGR rate REGRHR for the rich control that is different from the base high pressure EGR rate REGRHB, and this causes the high pressure EGR control valve opening degree VEGRH to be switched from the base high pressure EGR control valve opening degree VEGRHB to a high pressure EGR control valve opening degree VEGRHR for the rich control. The high pressure EGR control valve opening degree VEGRHR for the rich control is a high pressure EGR control valve opening degree that is required for the high pressure EGR rate REGRH to become the high pressure EGR rate REGRHR for the rich control. In the example that is illustrated in FIG. 16, the target high pressure EGR rate REGRHT is reduced, and thus the high pressure EGR control valve opening degree VEGRH is reduced. As a result, the high pressure EGR rate REGRH declines. The high pressure EGR rate REGRHR for the rich control is stored in advance in the ROM 32 in the form of the map which is illustrated in FIG. 23 and as the function of the depression amount L of the accelerator pedal 40 and the engine rotation speed N.

As a result, the pump loss PL further increases, and thus the increment dQm of the main fuel Qm further increases. In addition, the air-fuel ratio (A/F)in of the exhaust gas further declines. The throttle opening degree VTH is still maintained at the base throttle opening degree VTHB, and the injection of the additional fuel Qa remains stopped.

When the amount of the EGR gas from the low pressure EGR passage 16L and the amount of the EGR gas from the high pressure EGR passage 16H are decreased at the same time, the in-cylinder gas is subjected to a significant decrease and the compression end temperature TCE declines significantly. As a result, the risk of the occurrence of a misfire increases. The length of time that is required for the amount of the EGR gas supplied into the combustion chambers 2 to decrease after a decline in the low pressure EGR control valve opening degree VEGRL exceeds the length of time that is required for the amount of the EGR gas supplied into the combustion chambers 2 to decrease after a decline in the high pressure EGR control valve opening degree VEGRH. In this regard, in the example that is illustrated in FIG. 16, the high pressure EGR control valve opening degree VEGRH is declined after the low pressure EGR control valve opening degree VEGRL is declined.

In the example that is illustrated in FIG. 16, the high pressure EGR rate REGRHR for the rich control is set to exceed zero. In other words, the EGR gas is supplied from the low pressure EGR passage 16L during the rich control. In another example, the high pressure EGR rate REGRHR for the rich control is set to zero and the EGR gas supply from the high pressure EGR passage 16H is stopped during the rich control.

Then, once the high pressure EGR rate REGRH is switched to the high pressure EGR rate REGRHR for the rich control at time ta3, that is, once both the low pressure EGR rate REGRL and the high pressure EGR rate REGRH are respectively switched to the low pressure EGR rate REGRLR for the rich control and the high pressure EGR rate REGRHR for the rich control at time ta3, the throttle opening degree VTH is switched from the base throttle opening degree VTHB to a throttle opening degree VTHR for the rich control that is lower than the base throttle opening degree VTHB. As a result, the suctioned air amount Ga decreases to a suctioned air amount GaR for the rich control. The throttle opening degree VTHR for the rich control is stored in advance in the ROM 32 in the form of the map which is illustrated in FIG. 24 and as the function of the depression amount L of the accelerator pedal 40 and the engine rotation speed N.

A simultaneous decrease in the EGR gas amount and the suctioned air amount Ga might lead to a significant decrease in the concentration of the oxygen in the in-cylinder gas amount. As a result, the risk of the occurrence of the misfire increases. In this regard, in the example that is illustrated in FIG. 16, the throttle opening degree VTH is declined after the low pressure EGR control valve opening degree VEGRL and the high pressure EGR control valve opening degree VEGRH are declined.

Then, once the suctioned air amount Ga is switched to the suctioned air amount GaR for the rich control determined in accordance with the throttle opening degree VTHR for the rich control at time ta4, the injection of the additional fuel Qa is initiated. In this case, the additional fuel Qa is injected in a state where the suctioned air amount Ga is decreased and the EGR rate is declined, and thus the additional fuel Qa that is required for the enrichment of the air-fuel ratio (A/F)in of the exhaust gas can be reduced.

In addition, the main fuel amount Qm is switched to a main fuel amount QmR for the rich control. In the example that is illustrated in FIG. 16, a slight engine output is generated by some of the additional fuel Qa is burned in the combustion chambers 2. In this regard, the main fuel amount QmR for the rich control is slightly reduced compared to the base main fuel amount QmB such that the actual engine output corresponds to the required output. The main fuel amount QmR for the rich control is stored in advance in the ROM 32 in the form of the map which is illustrated in FIG.

25 and as the function of the depression amount L of the accelerator pedal 40 and the engine rotation speed N. Once the main fuel amount Qm is switched to the main fuel amount QmR for the rich control, an increase in the main fuel Qm based on the increment dQm is stopped.

As a result, the air-fuel ratio (A/F)in of the exhaust gas declines significantly. In the example that is illustrated in FIG. 16, the air-fuel ratio (A/F)in of the exhaust gas becomes richer than the stoichiometric air-fuel ratio AFS.

Figure 28:
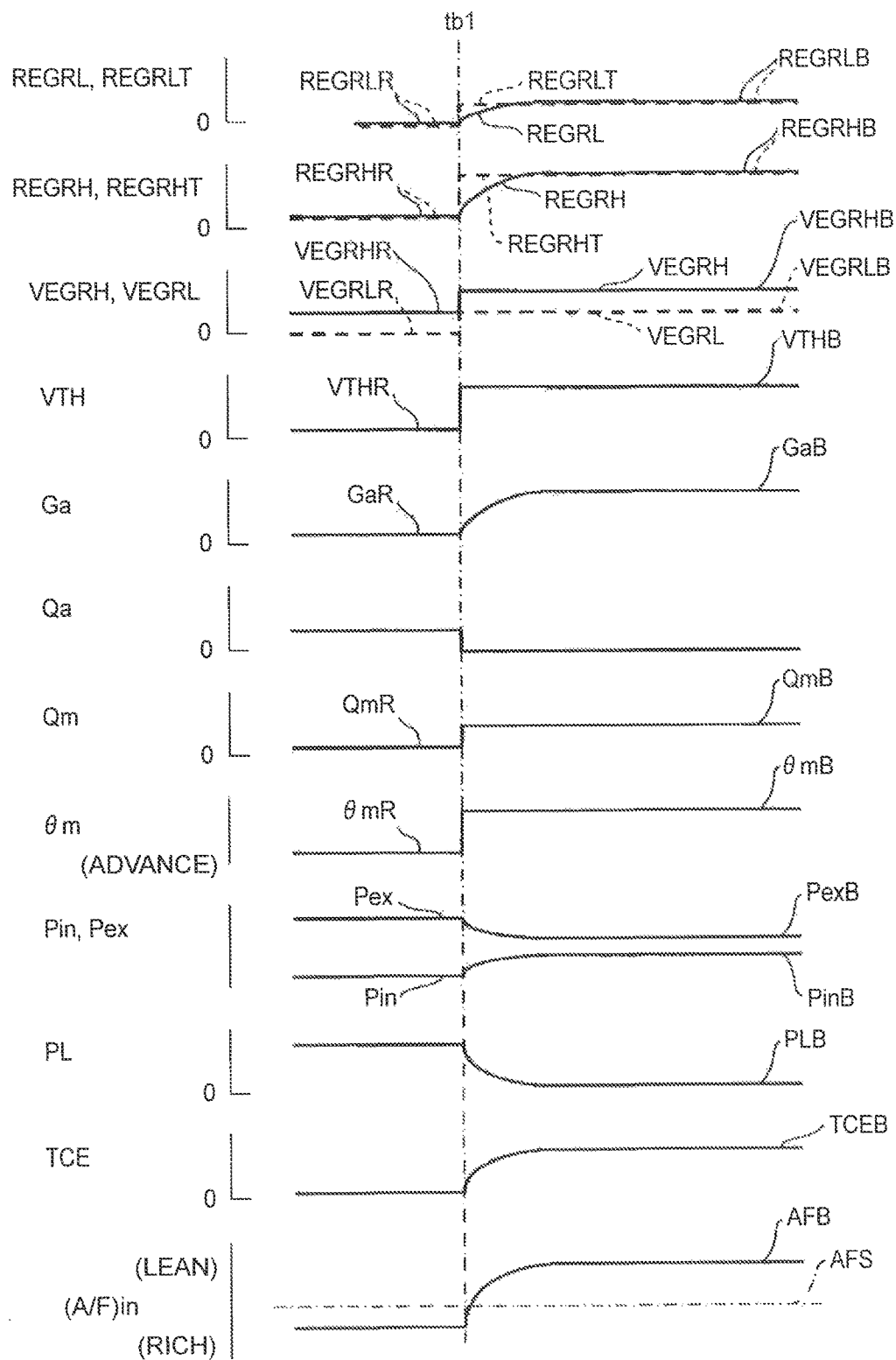
FIG. 28 is a time chart showing a time when the rich control is terminated.

FIG. 28 is a time chart showing a time when the rich control is terminated. Once a signal for the termination of the rich control is issued at time tb1, the target low pressure EGR rate REGRLT and the target high pressure EGR rate REGRHT are returned from the low pressure EGR rate REGRLR for the rich control and the high pressure EGR rate REGRHR for the rich control to the base low pressure EGR rate REGRLB and the base high pressure EGR rate REGRHB, respectively. This causes the low pressure EGR control valve opening degree VEGRL and the high pressure EGR control valve opening degree VEGRH to be returned from the low pressure EGR control valve opening degree VEGRLR for the rich control and the high pressure EGR control valve opening degree VEGRHR for the rich control to the base low pressure EGR control valve opening degree VEGRLB and the base high pressure EGR control valve opening degree VEGRHB, respectively. As a result, the low pressure EGR rate REGRL and the high pressure EGR rate REGRH rise and are returned to the base low pressure EGR rate REGRLB and the base high pressure EGR rate REGRHB, respectively.

In addition, the throttle opening degree VTH is returned from the throttle opening degree VTHR for the rich control to the base throttle opening degree VTHB. As a result, the suctioned air amount Ga increases and is returned to the base suctioned air amount GaB.

Furthermore, the additional fuel amount Qa becomes zero. In other words, the injection of the additional fuel Qa is stopped.

Moreover, the main fuel amount Qm is returned from the main fuel amount QmR for the rich control to the base main fuel amount QmB. Moreover, the main fuel injection timing θm is returned from the main fuel injection timing θmR for the rich control to the base main fuel injection timing θmB. As a result, the air-fuel ratio (A/F)in of the exhaust gas is returned to the base air-fuel ratio AFB.

As a result, the intake pressure Pin rises and is returned to the base intake pressure PinB. In addition, the exhaust pressure Pex declines and is returned to the base exhaust pressure PexB. Accordingly, the pump loss PL decreases and is returned to the base pump loss PLB. Furthermore, the compression end temperature TCE rises and is returned to the base compression end temperature TCEB.

The rich control is terminated in this manner, and the normal control is initiated.

Figure 29:
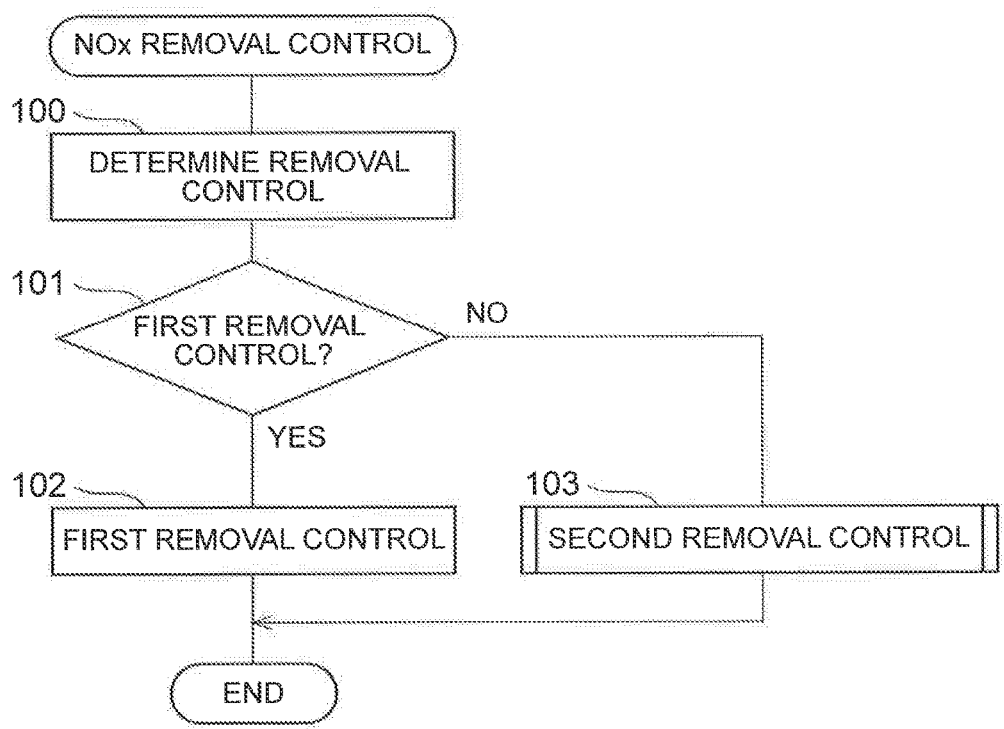
FIG. 29 is a flowchart for executing a NOx removal control.

FIG. 29 shows a routine for executing a NOx removal control according to the example of the invention. This routine is executed by interruption at regular time intervals.

Referring to FIG. 29, whether to perform the NOx removal action according to the first NOx removal control or the NOx removal action according to the second NOx removal control is determined first in Step 100. Then, in Step 101, it is determined whether or not the NOx removal action according to the first NOx removal control should be performed. When the NOx removal action according to the first NOx removal control should be performed, the processing proceeds to Step 102 and the NOx removal action according to the first NOx removal control is performed. In other words, the hydrocarbons are injected from the hydrocarbon supply valve 15, by the injection quantity W illustrated in FIG. 11, at the injection cycle ΔT determined in advance in accordance with the operation states of the engine.

When it is determined in Step 101 that the NOx removal action according to the second NOx removal control should be executed, the processing proceeds to Step 103 and a routine for executing the NOx removal action according to the second NOx removal control is executed. This routine is illustrated in FIG. 30.

Figure 30:
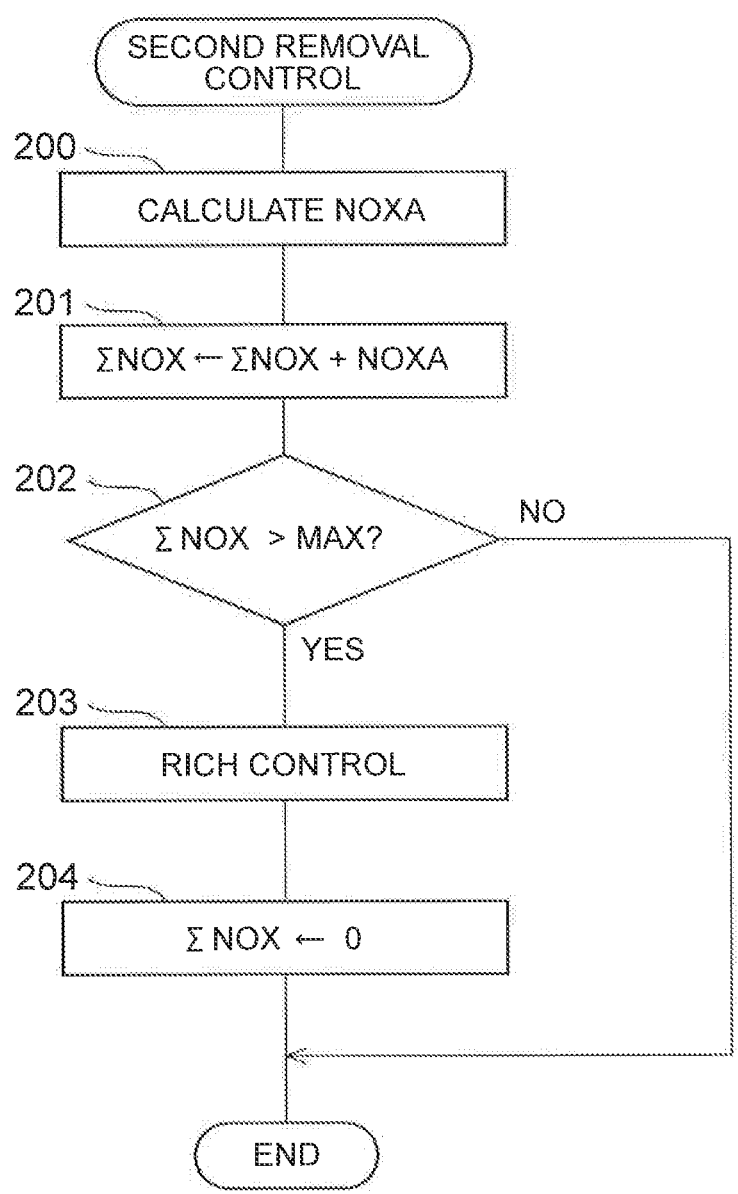
FIG. 30 is a flowchart for executing a NOx removal action according to a second NOx removal control.

FIG. 30 shows the routine for executing the NOx removal action according to the second NOx removal control. This routine is executed in Step 103 in FIG. 29.

Referring to FIG. 30, in Step 200, the discharged NOx amount NOXA per unit time is calculated first from the map which is illustrated in FIG. 13. Then, in Step 201, the stored NOx amount ΣNOX is calculated by the discharged NOx amount NOXA being integrated (ΣNOX=ΣNOX+NOXA). Then, in Step 202, it is determined whether or not the stored NOx amount ΣNOX exceeds the allowable value MAX. The processing cycle is terminated when the ΣNOX is equal to or smaller than the MAX.

Figure 31:
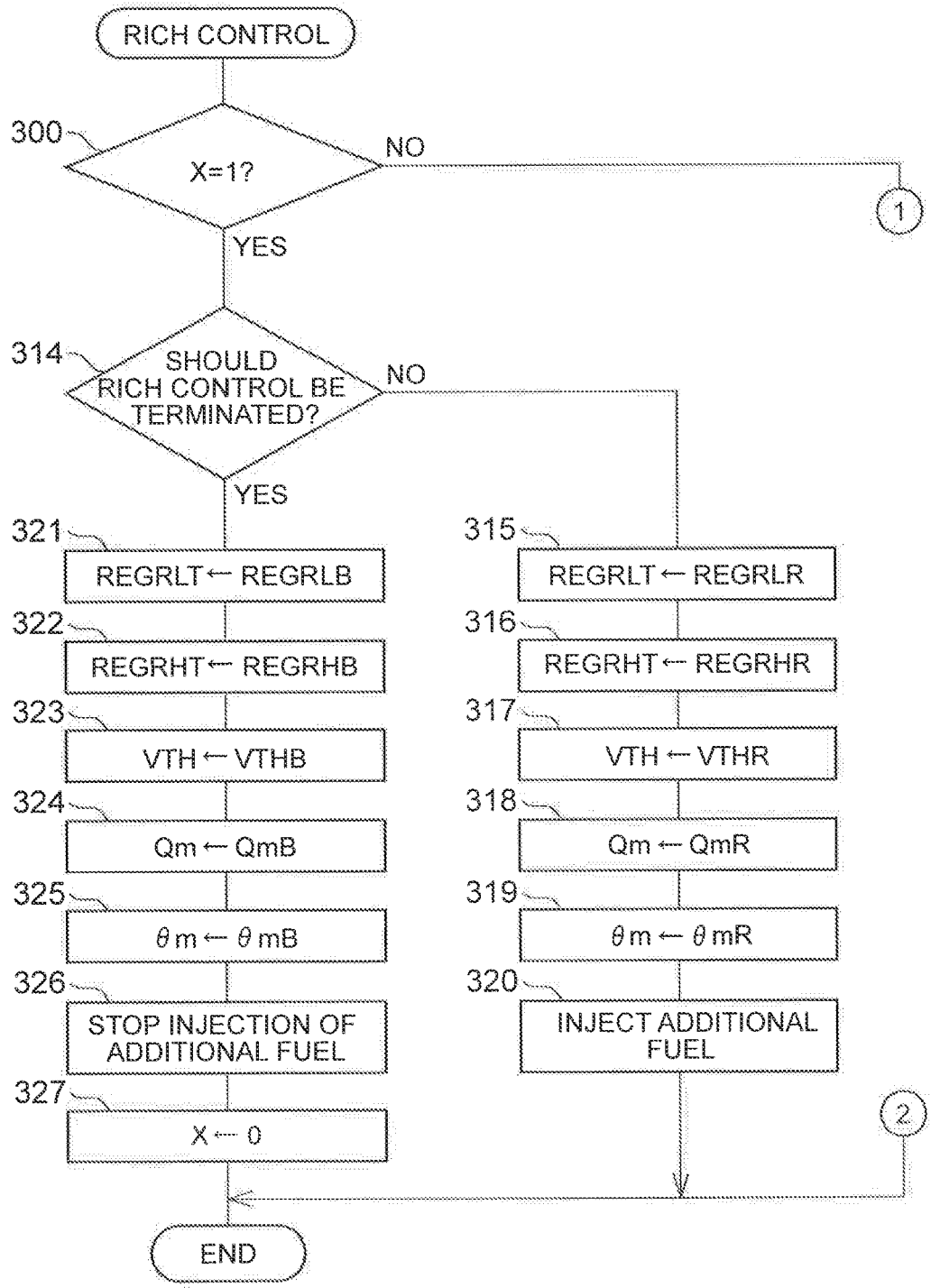
FIG. 31 is a flowchart for executing the rich control.
Figure 32:
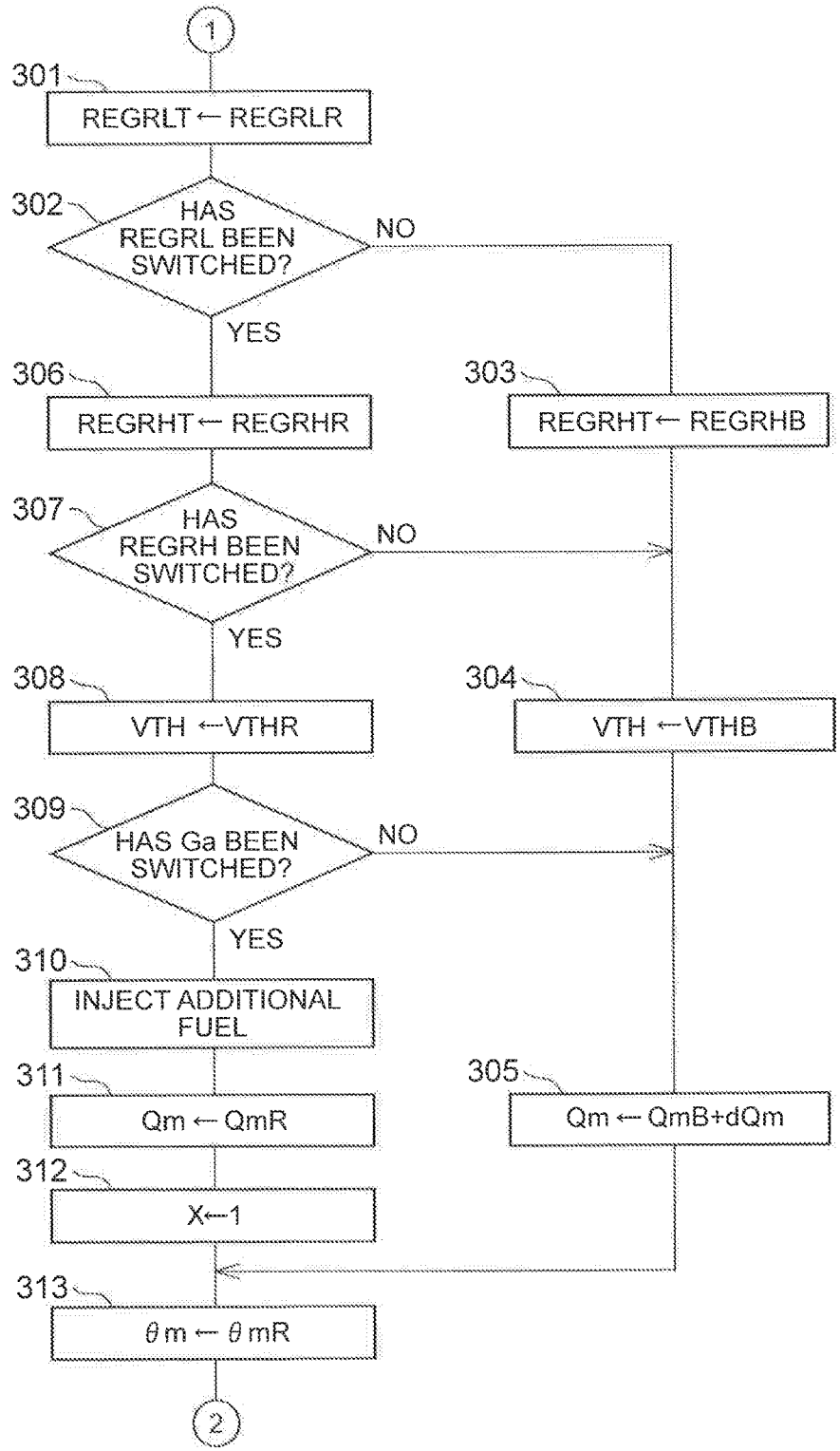
FIG. 32 is a flowchart for executing the rich control.

Once the ΣNOX exceeds the MAX, the processing proceeds to Step 203 from Step 202 and a routine for executing the rich control is executed. This routine is illustrated in FIGS. 31 and 32. Then, in Step 204, the stored NOx amount ΣNOX is cleared.

FIGS. 31 and 32 show the routine for executing the rich control. This routine is executed in Step 203 in FIG. 30.

Referring to FIGS. 31 and 32, in Step 300, it is first determined whether or not a flag X is set. This flag X is set (X=1) when the injection of the additional fuel Qa should be performed and is reset (X=0) otherwise. When the flag X1 is reset, the processing proceeds to Step 301 from Step 300. In Step 301, the low pressure EGR rate REGRLR for the rich control is calculated from the map in FIG. 22 and the target low pressure EGR rate REGRLT is set to the low pressure EGR rate REGRLR for the rich control. Then, in Step 302, it is determined whether or not the low pressure EGR rate REGRL has been switched to the low pressure EGR rate REGRLR for the rich control. When the low pressure EGR rate REGRL has not been switched to the low pressure EGR rate REGRLR for the rich control, the processing proceeds to Step 303 from Step 302. In Step 303, the base high pressure EGR rate REGRHB is calculated from the map in FIG. 18 and the target high pressure EGR rate REGRHT is set to the base high pressure EGR rate REGRHB. Then, in Step 304, the base throttle opening degree VTHB is calculated from the map in FIG. 19 and the throttle opening degree VTH is set to the base throttle opening degree VTHB. Then, in Step 305, the base main fuel amount QmB is calculated from the map in FIG. 20, the increment dQm is calculated from the map in FIG. 27, and the main fuel amount Qm is calculated (Qm=QmB+dQm). Then, the processing jumps to Step 313.

Once the low pressure EGR rate REGRL is switched to the low pressure EGR rate REGRLR for the rich control, the processing proceeds to Step 306 from Step 302. In Step 306, the high pressure EGR rate REGRHR for the rich control is calculated from the map in FIG. 23 and the target high pressure EGR rate REGRHT is set to the high pressure EGR rate REGRHR for the rich control. Then, in Step 307, it is determined whether or not the high pressure EGR rate REGRH has been switched to the high pressure EGR rate REGRHR for the rich control. The processing proceeds to Step 304 from Step 307 when the high pressure EGR rate REGRH has not been switched to the high pressure EGR rate REGRHR for the rich control. The processing proceeds to Step 308 from Step 307 when the high pressure EGR rate REGRH has been switched to the high pressure EGR rate REGRHR for the rich control. In Step 308, the throttle opening degree VTHR for the rich control is calculated from the map in FIG. 24 and the throttle opening degree VTH is set to the throttle opening degree VTHR for the rich control.

Figure 25:
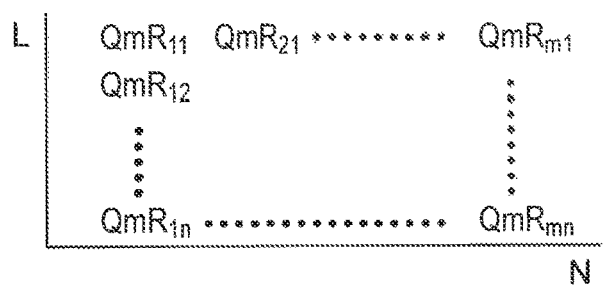
FIG. 25 is a drawing illustrating a map of a main fuel amount QmR for the rich control.

Then, in Step 309, it is determined whether or not the suctioned air amount Ga has been switched to the suctioned air amount GaR for the rich control. The processing proceeds to Step 305 from Step 309 when the suctioned air amount Ga has not been switched to the suctioned air amount GaR for the rich control. The processing proceeds to Step 310 from Step 309 when the suctioned air amount Ga has been switched to the suctioned air amount GaR for the rich control. In Step 310, the injection of the additional fuel Qa is performed. Then, in Step 311, the main fuel amount QmR for the rich control is calculated from the map in FIG. 25 and the main fuel amount Qm is set to the main fuel amount QmR for the rich control. Then, in Step 312, the flag X is set (X=1). Then, the processing proceeds to Step 313.

In Step 313, the main fuel injection timing θmR for the rich control is calculated from the map in FIG. 26 and the main fuel injection timing θm is set to the main fuel injection timing θmR for the rich control.

Then, in Step 314, it is determined whether or not the rich control should be terminated. The processing proceeds to Step 315 when it is not determined that the rich control should be terminated. In Step 315, the low pressure EGR rate REGRLR for the rich control is calculated from the map in FIG. 22 and the target low pressure EGR rate REGRLT is set to the low pressure EGR rate REGRLR for the rich control. Then, in Step 316, the high pressure EGR rate REGRHR for the rich control is calculated from the map in FIG. 23 and the target high pressure EGR rate REGRHT is set to the high pressure EGR rate REGRHR for the rich control. Then, in Step 317, the throttle opening degree VTHR for the rich control is calculated from the map in FIG. 24 and the throttle opening degree VTH is set to the throttle opening degree VTHR for the rich control. Then, in Step 318, the main fuel amount QmR for the rich control is calculated from the map in FIG. 25 and the main fuel amount Qm is set to the main fuel amount QmR for the rich control. Then, in Step 319, the main fuel injection timing θmR for the rich control is calculated from the map in FIG. 26 and the main fuel injection timing θm is set to the main fuel injection timing θmR for the rich control. Then, in Step 320, the injection of the additional fuel Qa is performed.

After the rich control is performed for a certain period of time, for example, it is determined that the rich control should be terminated. When it is determined that the rich control should be terminated, the processing proceeds to Step 321 from Step 314. In Step 321, the base low pressure EGR rate REGRLB is calculated from the map in FIG. 17 and the target low pressure EGR rate REGRLT is set to the base low pressure EGR rate REGRLB. Then, in Step 322, the base high pressure EGR rate REGRHB is calculated from the map in FIG. 18 and the target high pressure EGR rate REGRHT is set to the base high pressure EGR rate REGRHB. Then, in Step 323, the base throttle opening degree VTHB is calculated from the map in FIG. 19 and the throttle opening degree VTH is set to the base throttle opening degree VTHB. Then, in Step 324, the base main fuel amount QmB is calculated from the map in FIG. 20 and the main fuel amount Qm is set to the base main fuel amount QmB. Then, in Step 325, the base main fuel injection timing θmB is calculated from the map in FIG. 21 and the main fuel injection timing θm is set to the base main fuel injection timing θmB. Then, in Step 326, the injection of the additional fuel Qa is stopped. Then, in Step 327, the flag X is reset (X=0).

Hereinafter, another example of the invention will be described.

In the example that is illustrated in FIG. 16, the low pressure EGR control valve opening degree VEGRL is first switched to the low pressure EGR control valve opening degree VEGRLR for the rich control when the rich control is initiated, and then the high pressure EGR control valve opening degree VEGRH is switched to the high pressure EGR control valve opening degree VEGRHR for the rich control once the low pressure EGR rate REGRL is switched from the base low pressure EGR rate REGRLB to the low pressure EGR rate REGRLR for the rich control.

In this case, the base low pressure EGR rate REGRLB and the low pressure EGR rate REGRLR for the rich control at the point in time when the rich control is initiated are determined in accordance with the engine operation states at that point in time. Accordingly, the amount of change dREGRL (=REGRLB−REGRLR) from the base low pressure EGR rate REGRLB to the low pressure EGR rate REGRLR for the rich control is small in some cases and large in the other cases.

When this amount of change dREGRL is large, a long period of time is required for the switching from the low pressure EGR rate REGRL to the low pressure EGR rate REGRLR for the rich control, and thus a long period of time is required for the switching from the high pressure EGR control valve opening degree VEGRH to the high pressure EGR control valve opening degree VEGRHR for the rich control. As a result, a long period of time is required for the additional fuel Qa to be injected after the signal for the initiation of the rich control is issued, and thus a long period of time is required for the air-fuel ratio (A/F)in of the exhaust gas to be switched to a rich one.

In this regard, in another example according to the invention, the target low pressure EGR rate REGRLT and the target high pressure EGR rate REGRHT are respectively set to the low pressure EGR rate REGRLR for the rich control and the high pressure EGR rate REGRHR for the rich control at the same time when the amount of change dREGRL in the low pressure EGR rate exceeds a limit amount dREGRLX determined in advance, and this causes the low pressure EGR control valve opening degree VEGRL and the high pressure EGR control valve opening degree VEGRH to be respectively set to the low pressure EGR control valve opening degree VEGRLR for the rich control and the high pressure EGR control valve opening degree VEGRHR for the rich control at the same time. As a result, the length of time that is required for the air-fuel ratio (A/F)in of the exhaust gas to be switched to a rich one can be shortened.

Figure 33:
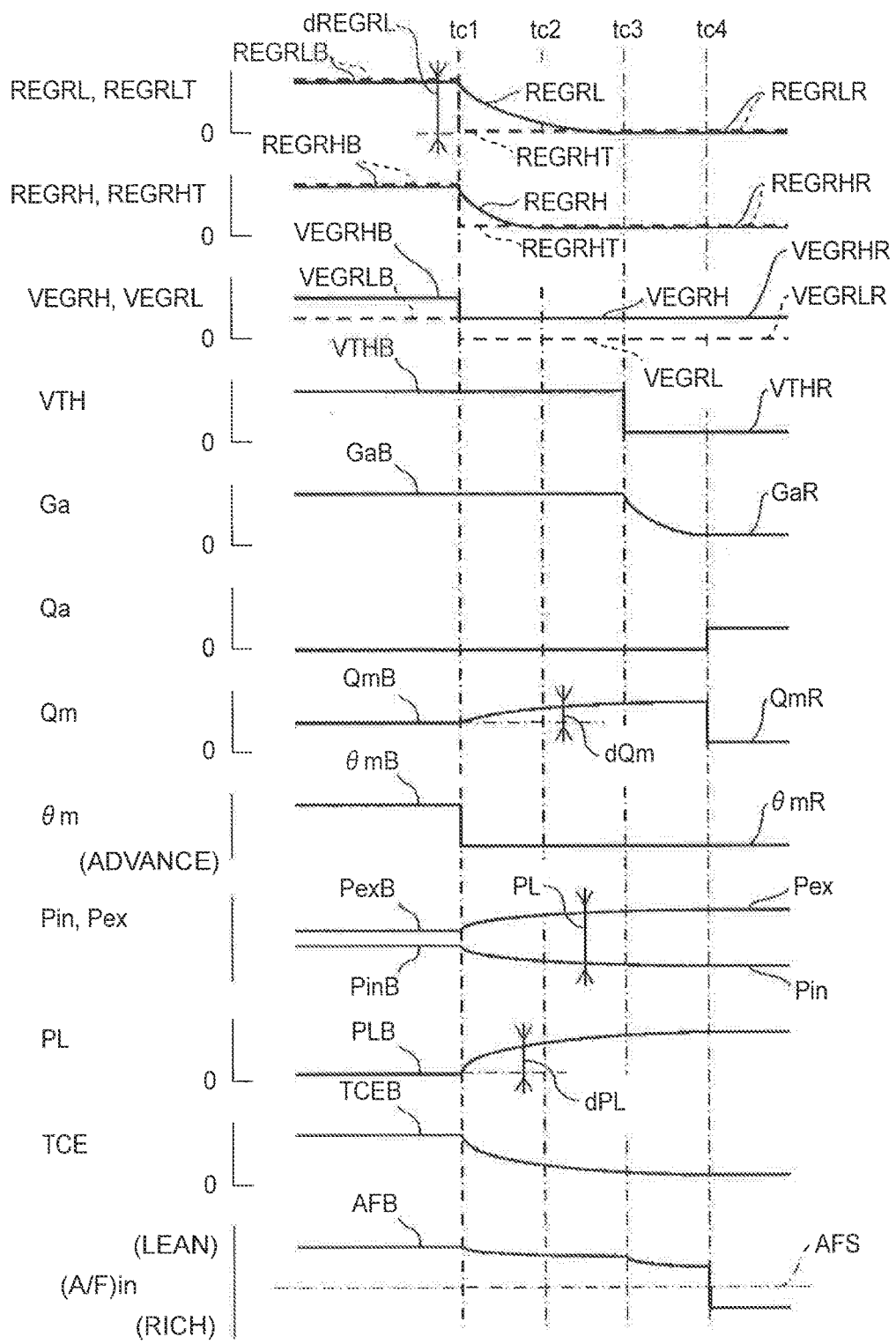
FIG. 33 is a time chart showing a time when the rich control according to another example of the invention is initiated.

FIG. 33 shows a case where the amount of change dREGRL is larger than the limit amount dREGRLX. Once the signal for the initiation of the rich control is issued at time tc1, the target low pressure EGR rate REGRLT is switched from the base low pressure EGR rate REGRLB to the low pressure EGR rate REGRLR for the rich control, and this causes the low pressure EGR control valve opening degree VEGRL to be switched from the base low pressure EGR control valve opening degree VEGRLB to the low pressure EGR control valve opening degree VEGRLR for the rich control. At the same time, the target high pressure EGR rate REGRHT is switched from the base high pressure EGR rate REGRHB to the high pressure EGR rate REGRHR for the rich control, and this causes the high pressure EGR control valve opening degree VEGRH to be switched from the base high pressure EGR control valve opening degree VEGRHB to the high pressure EGR control valve opening degree VEGRHR for the rich control. In addition, an increase in the amount of the main fuel Qm is initiated at this time, and the main fuel injection timing θm is switched to the injection timing θmR for the rich control from the base main fuel injection timing θmB.

In the example that is illustrated in FIG. 17, the high pressure EGR rate REGRH is switched to the high pressure EGR rate REGRHR for the rich control at the subsequent time tc2. Then, at time tc3, the low pressure EGR rate REGRL is switched to the low pressure EGR rate REGRLR for the rich control. In another example, the low pressure EGR rate REGRL is switched to the low pressure EGR rate REGRLR for the rich control, and then the high pressure EGR rate REGRH is switched to the high pressure EGR rate REGRHR for the rich control. In yet another example, the low pressure EGR rate REGRL and the high pressure EGR rate REGRH are respectively switched to the low pressure EGR rate REGRLR for the rich control and the high pressure EGR rate REGRHR for the rich control almost at the same time.

In any case, the throttle opening degree VTH is switched from the base throttle opening degree VTHB to the throttle opening degree VTHR for the rich control once the low pressure EGR rate REGRL and the high pressure EGR rate REGRH are switched to the low pressure EGR rate REGRLR for the rich control and the high pressure EGR rate REGRHR for the rich control, respectively.

Then, the injection of the additional fuel Qa is initiated once the suctioned air amount Ga is switched to the suctioned air amount GaR for the rich control determined in accordance with the throttle opening degree VTHR for the rich control at time tc4. In addition, the increase in the amount of the main fuel Qm is stopped at this time, and the main fuel Qm is switched to the main fuel amount QmR for the rich control.

When the amount of change dREGRL is smaller than the limit amount dREGRLX, the high pressure EGR control valve opening degree VEGRH is switched to the high pressure EGR control valve opening degree VEGRHR for the rich control after the low pressure EGR control valve opening degree VEGRL is switched to the low pressure EGR control valve opening degree VEGRLR for the rich control as in the example that is illustrated in FIG. 16.

Figure 34:
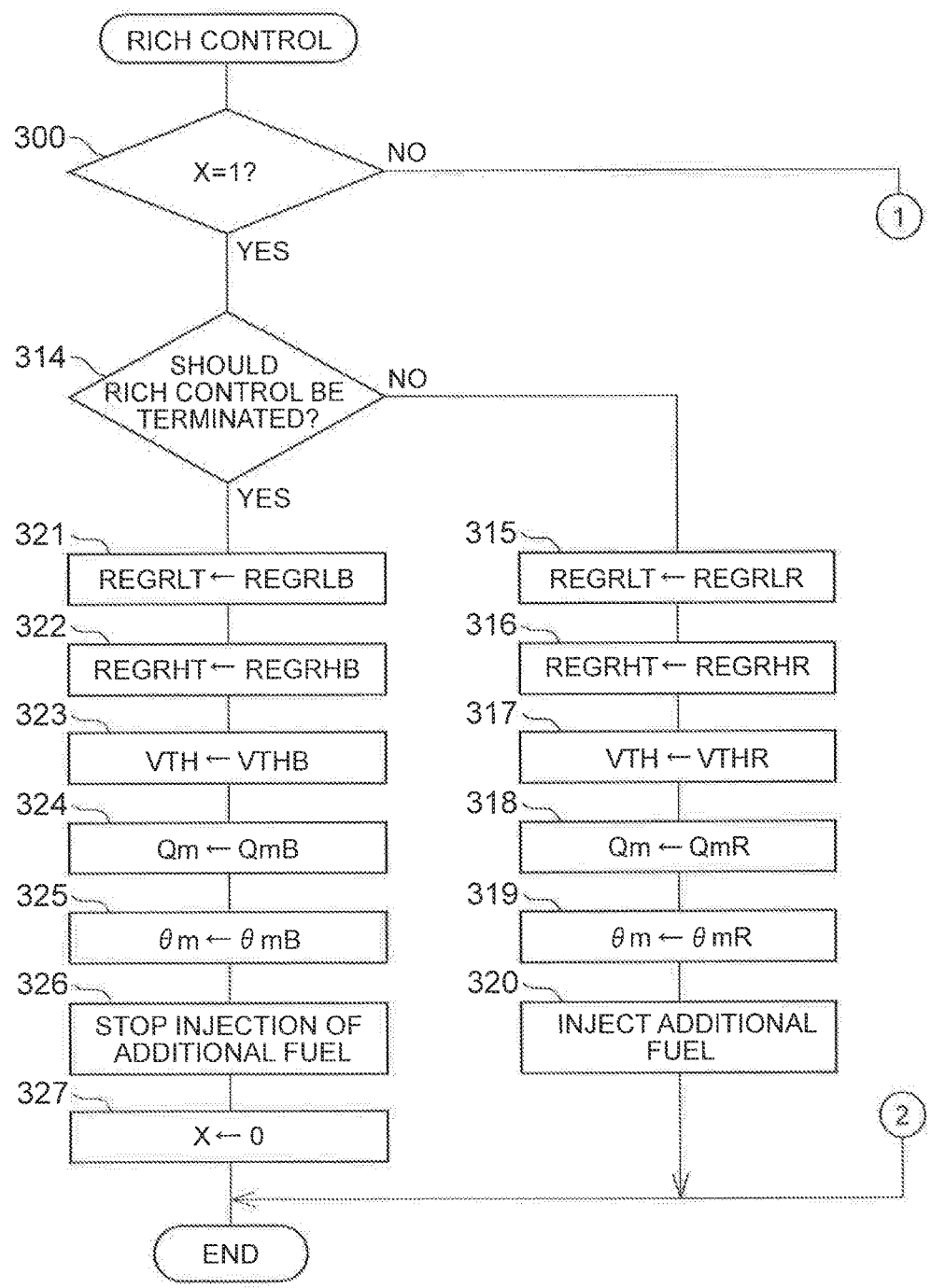
FIG. 34 is a flowchart for executing the rich control according to another example of the invention.
Figure 35:
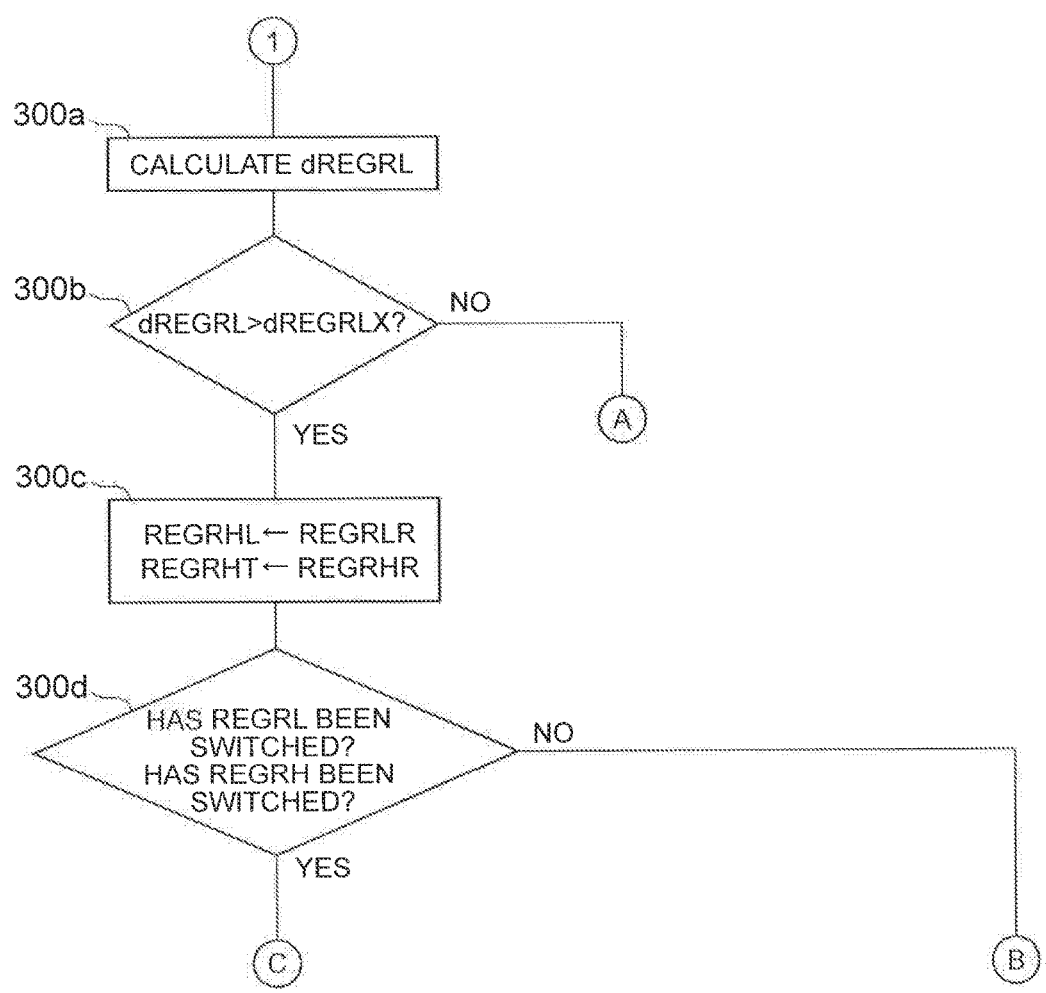
FIG. 35 is a flowchart for executing the rich control according to another example of the invention.
Figure 36:
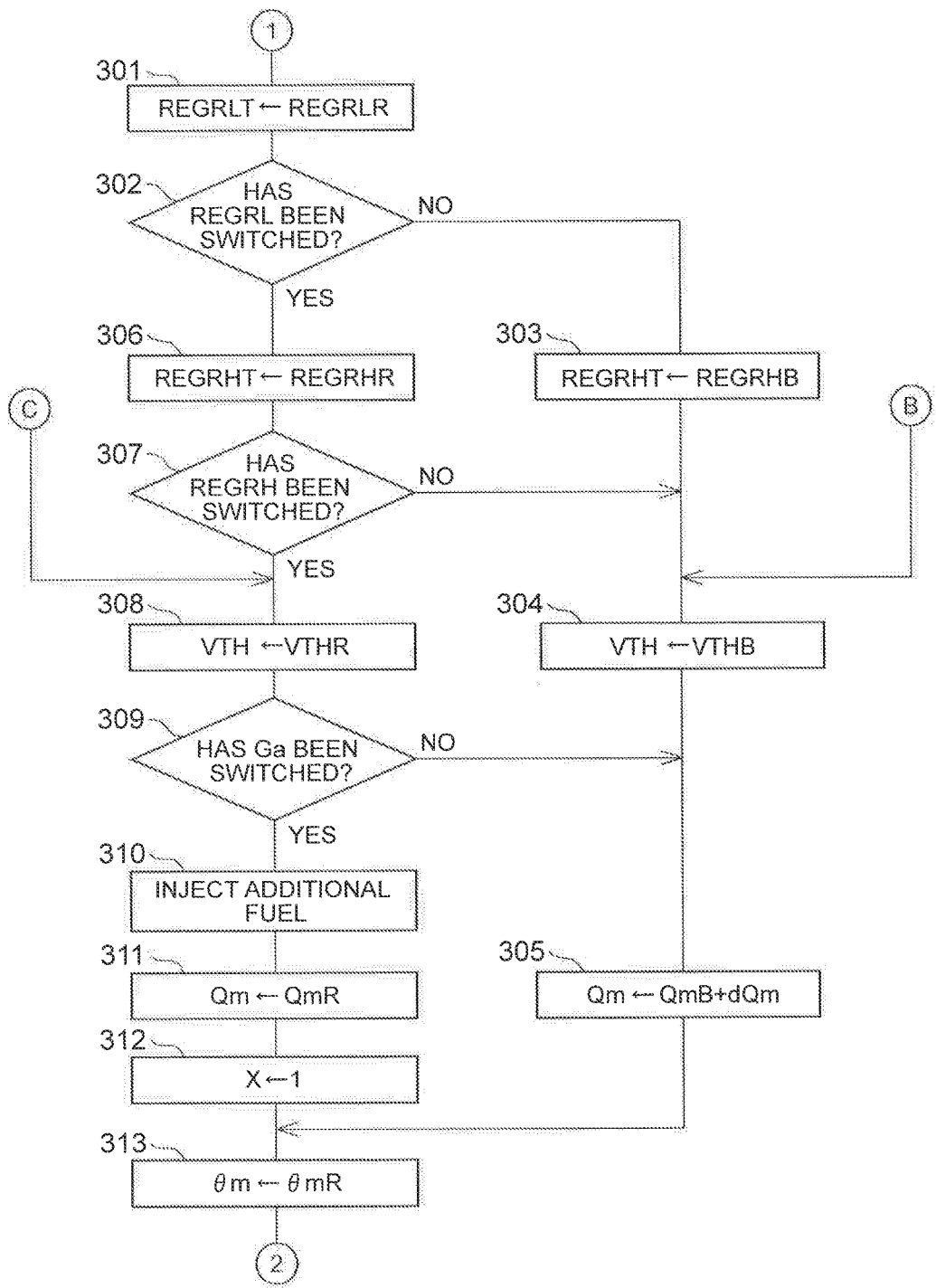
FIG. 36 is a flowchart for executing the rich control according to another example of the invention.

FIGS. 34 to 36 show a routine for executing the rich control according to another example of the invention. This routine is executed in Step 203 in FIG. 30. The routine that is illustrated in FIGS. 34 to 36 differs from the routine that is illustrated in FIGS. 31 and 32 in the following aspects. In other words, when the flag is reset (X=0) in Step 300, the processing proceeds to the subsequent Step 300*a*. In Step 300*a*, the base low pressure EGR rate REGRLB is calculated from the map in FIG. 17, the low pressure EGR rate REGRLR for the rich control is calculated from the map in FIG. 22, and the amount of change dREGRL is calculated (dREGRL=REGRLB−REGRLR). Then, in Step 300*b*, it is determined whether or not the amount of change dREGRL is larger than the limit amount dREGRLX. When the dREGRLX is equal to or larger than the dREGRL, the processing proceeds to the subsequent Step 301.

In contrast, when the dREGRL is larger than the dREGRLX, the processing proceeds to the subsequent Step 300*c*, in which the target low pressure EGR rate REGRLT is set to the low pressure EGR rate REGRLR for the rich control calculated in Step 300*a*. In addition, the high pressure EGR rate REGRHR for the rich control is calculated from the map in FIG. 23 and the target high pressure EGR rate REGRHT is set to the high pressure EGR rate REGRHR for the rich control. Then, in Step 300*d*, it is determined whether or not the low pressure EGR rate REGRL has been switched to the low pressure EGR rate REGRLR for the rich control and the high pressure EGR rate REGRH has been switched to the high pressure EGR rate REGRHR for the rich control. The processing proceeds to the subsequent Step 304 when the low pressure EGR rate REGRL has not been switched to the low pressure EGR rate REGRLR for the rich control or the high pressure EGR rate REGRH has not been switched to the high pressure EGR rate REGRHR for the rich control. In contrast, the processing proceeds to Step 308 when it is determined that the low pressure EGR rate REGRL has been switched to the low pressure EGR rate REGRLR for the rich control and the high pressure EGR rate REGRH has been switched to the high pressure EGR rate REGRHR for the rich control.

In each of the examples of the invention described above, the rich control is performed so that the NOx is released from the exhaust gas control catalyst 13. In another example, the rich control is performed so that SOx is released from the exhaust gas control catalyst 13. During the rich control in this case, the air-fuel ratio (A/F)in of the exhaust gas flowing into the exhaust gas control catalyst 13 is allowed to remain richer than the stoichiometric air-fuel ratio while the temperature of the exhaust gas control catalyst 13 is maintained at or above a SOx release temperature (such as 600° C.). In yet another example, the rich control is performed so that the temperature of the exhaust gas control catalyst 13 is raised. During the rich control in this case, the air-fuel ratio (A/F)in of the exhaust gas flowing into the exhaust gas control catalyst 13 is allowed to remain leaner than the stoichiometric air-fuel ratio.

As another example, an oxidation catalyst for reforming the hydrocarbon can also be disposed in the engine exhaust passage on the upstream side of the exhaust gas control catalyst 13.

REFERENCE SIGNS LIST

2 . . . COMBUSTION CHAMBER, 4 . . . INTAKE MANIFOLD, 5 . . . EXHAUST MANIFOLD, 10 . . . THROTTLE VALVE, 12*a*, 12*b*, 12*c* . . . EXHAUST PIPE, 13 . . . EXHAUST GAS CONTROL CATALYST, 15 . . . HYDROCARBON SUPPLY VALVE, 16H . . . HIGH PRESSURE EGR PASSAGE, 16L . . . LOW PRESSURE EGR PASSAGE, 17H . . . HIGH PRESSURE EGR CONTROL VALVE, 17L . . . LOW PRESSURE EGR CONTROL VALVE

The invention claimed is:

1. An exhaust gas control apparatus for an internal combustion engine, the internal combustion engine including an engine intake passage, a throttle valve disposed in the engine intake passage to control a suctioned air amount, an engine exhaust passage, an exhaust turbocharger including a compressor disposed in the engine intake passage upstream of the throttle valve and driven by an exhaust turbine disposed in the engine exhaust passage, a high pressure exhaust gas recirculation passage having a high pressure exhaust gas recirculation control valve to control a high pressure exhaust gas recirculation rate, and a low pressure exhaust gas recirculation passage having a low pressure exhaust gas recirculation control valve to control a low pressure exhaust gas recirculation rate, wherein the low pressure exhaust gas recirculation passage connects the engine exhaust passage downstream of the exhaust turbine and the engine intake passage upstream of the compressor, the exhaust gas control apparatus comprising
an electronic control unit including executable instructions stored on non-transitory memory to:
initiate a rich control for temporarily declining an air-fuel ratio of exhaust gas discharged from an engine combustion chamber;
control, in sequence:
the low pressure exhaust gas recirculation rate from a base low pressure exhaust gas recirculation rate to a low pressure exhaust gas recirculation rate different from the base low pressure exhaust gas recirculation rate for the rich control,
the high pressure exhaust gas recirculation rate from a base high pressure exhaust gas recirculation rate to a high pressure exhaust gas recirculation rate different from the base high pressure exhaust gas recirculation rate for the rich control, and
a throttle opening degree of the throttle valve from a base throttle opening degree to a throttle opening degree lower than the base throttle opening degree for the rich control; and
initiate injection of additional fuel into a cylinder in an expansion stroke or an exhaust stroke, wherein the additional fuel is fuel injected into the cylinder in addition to main fuel that is for combustion in the cylinder.

2. The exhaust gas control apparatus for the internal combustion engine according to claim 1,
wherein the executable Instructions in the electronic control unit further comprise instructions to increase an amount of the main fuel until the injection of the additional fuel is initiated after the low pressure exhaust gas recirculation control valve opening degree is switched to a low pressure exhaust gas recirculation control valve opening degree for the rich control.

3. The exhaust gas control apparatus for the internal combustion engine according to claim 2,
wherein the executable Instructions in the electronic control unit further comprise instructions to set an increment amount of the main fuel based on a deviation of a pump loss with respect to a base pump loss determined in accordance with the base throttle opening degree, the base high pressure exhaust gas recirculation rate, and the base low pressure exhaust gas recirculation rate.

4. The exhaust gas control apparatus for the internal combustion engine according to claim 1,
wherein the executable instructions in the electronic control unit further comprise instructions to switch a main fuel injection timing from a base main fuel injection timing to a main fuel injection timing for the rich control when the low pressure exhaust gas recirculation control valve opening degree is controlled such that the low pressure exhaust gas recirculation rate is switched to the low pressure exhaust gas recirculation rate for the rich control.

5. The exhaust gas control apparatus for the internal combustion engine according to claim 1, wherein the internal combustion engine further includes an exhaust gas control catalyst disposed in the engine exhaust passage, wherein the exhaust gas control catalyst reduces NOx contained in the exhaust gas when a concentration of hydrocarbons flowing into the exhaust gas control catalyst is vibrated at an amplitude range within a predetermined amplitude range and a cycle range within a predetermined cycle range, and the exhaust gas control catalyst increases a stored amount of the NOx contained in the exhaust gas when a hydrocarbon concentration vibration cycle exceeds the predetermined cycle range; and a hydrocarbon supply valve disposed in the engine exhaust passage upstream of the exhaust gas control catalyst, wherein a noble metal catalyst is supported on an exhaust gas flow surface of the exhaust gas control catalyst, and the noble metal catalyst includes a basic exhaust gas flow surface,
wherein the electronic control unit further comprises executable instructions to selectively execute a first NOx removal control and a second NOx removal control,
wherein the first NOx removal control is a control for removing the NOx contained in the exhaust gas by the hydrocarbons being injected from the hydrocarbon supply valve at the cycle within the predetermined cycle range,
wherein the second NOx removal control is a control for releasing the stored amount of the NOx from the exhaust gas control catalyst and removing the NOx by the air-fuel ratio of the exhaust gas flowing into the exhaust gas control catalyst being enriched at a cycle range exceeding the predetermined cycle range, and
wherein, for the rich control, the air-fuel ratio of the exhaust gas flowing into the exhaust gas control catalyst becomes richer than a stoichiometric air-fuel ratio with regard to the second NOx removal control.

\* \* \* \* \*